US011932448B2

(12) United States Patent
Bartolucci et al.

(10) Patent No.: US 11,932,448 B2
(45) Date of Patent: Mar. 19, 2024

(54) BOTTLE ADAPTED FOR STORING A LIQUID COMPOSITION WITH AN AESTHETIC DESIGN SUSPENDED THEREIN

(71) Applicant: The Procter & Gamble Company, Cincinnati, OH (US)

(72) Inventors: Stefano Bartolucci, Singapore (SG); Mark Anthony Brown, Union, KY (US); Emily Lao Hickey, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 118 days.

(21) Appl. No.: 17/174,427

(22) Filed: Feb. 12, 2021

(65) Prior Publication Data

US 2021/0253303 A1 Aug. 19, 2021

Related U.S. Application Data

(60) Provisional application No. 62/977,140, filed on Feb. 14, 2020.

(51) Int. Cl.

| | |
|---|---|
| ***B65D 1/02*** | (2006.01) |
| ***A45D 34/00*** | (2006.01) |
| ***B05B 11/00*** | (2023.01) |
| ***B05B 11/10*** | (2023.01) |
| ***B65D 23/12*** | (2006.01) |
| ***B67C 3/22*** | (2006.01) |

(Continued)

(52) U.S. Cl.
CPC ............. *B65D 23/12* (2013.01); *A45D 34/00* (2013.01); *B05B 11/0097* (2013.01); *B05B 11/1046* (2023.01); *B05B 11/1047* (2023.01); *B65D 1/0207* (2013.01); *B67C 3/22* (2013.01); *B67C 7/00* (2013.01); *A45D 2034/007* (2013.01); *B05B 15/30* (2018.02)

(58) Field of Classification Search
CPC ...... B65D 23/12; B65D 1/0207; A45D 34/00; A45D 2034/007; B05B 11/3046; B05B 15/30; B05B 11/3047; B05B 11/0097; B05B 11/1046; B05B 11/1047; B67C 3/22; B67C 7/00
See application file for complete search history.

(56) References Cited

U.S. PATENT DOCUMENTS

| | | | |
|---|---|---|---|
| 1,094,935 | A | 4/1914 | Schenck et al. |
| 2,326,733 | A | 8/1943 | Fisher |

(Continued)

FOREIGN PATENT DOCUMENTS

| | | | |
|---|---|---|---|
| AU | 2012337567 | B2 | 4/2017 |
| CA | 2143558 | A1 | 8/1996 |

(Continued)

OTHER PUBLICATIONS

PCT Search Report and Written Opinion for PCT/US2021/070145 dated Jun. 2, 2021,11 pages.

(Continued)

*Primary Examiner* — Frederick C Nicolas
(74) *Attorney, Agent, or Firm* — John G. Powell; Alexandra S. Anoff

(57) ABSTRACT

A method and package for maintaining a design suspended in a liquid beauty product where the package has a bottle, an insert, and an overcap. The insert has a pierceable membrane that can be pierced by the dip tube of the pump after shipping and handling.

18 Claims, 11 Drawing Sheets

(51) Int. Cl.
*B67C 7/00* (2006.01)
*B05B 15/30* (2018.01)

(56) References Cited

U.S. PATENT DOCUMENTS 2,396,278 A 3/1946 Otto
2,438,091 A 3/1948 Lynch
2,486,921 A 11/1949 Byerly
2,486,922 A 11/1949 Bruce
2,528,378 A 10/1950 Mccabe, Jr.
2,658,072 A 11/1953 Milton
2,694,668 A 11/1954 Fricke
2,786,847 A 3/1957 Cislak
2,798,053 A 7/1957 Brown
2,809,971 A 10/1957 Bernstein
2,826,551 A 3/1958 Geen
3,152,046 A 10/1964 Kapral
3,155,591 A 11/1964 Hilfer
3,236,733 A 2/1966 Karsten
3,332,880 A 7/1967 Kessler
3,589,999 A 6/1971 Mcrae
3,590,035 A 6/1971 Damico
3,655,096 A 4/1972 Easter
3,753,196 A 8/1973 Kurtz
3,761,418 A 9/1973 Parran
3,773,770 A 11/1973 Damico
3,852,441 A 12/1974 Kooistra
3,929,678 A 12/1975 Laughlin et al.
3,940,482 A 2/1976 Grand
3,958,581 A 5/1976 Abegg
3,959,461 A 5/1976 Bailey
3,964,500 A 6/1976 Drakoff
4,055,655 A 10/1977 Maurer
4,089,945 A 5/1978 Brinkman
4,152,416 A 5/1979 Marra
4,161,426 A 7/1979 Kneer
4,197,865 A 4/1980 Jacquet
4,217,914 A 8/1980 Jacquet
4,323,683 A 4/1982 Bolich, Jr.
4,345,080 A 8/1982 Bolich, Jr.
4,364,387 A 12/1982 Larkin
4,379,753 A 4/1983 Bolich, Jr.
4,381,919 A 5/1983 Jacquet
4,387,090 A 6/1983 Bolich, Jr.
4,422,853 A 12/1983 Jacquet
4,470,982 A 9/1984 Winkler
4,507,280 A 3/1985 Pohl
4,529,586 A 7/1985 De Marco
4,565,647 A 1/1986 Llenado
4,604,272 A 8/1986 Kratel
4,608,183 A 8/1986 Rossmoore
4,663,158 A 5/1987 Wolfram
4,666,616 A 5/1987 Rossmoore
4,670,430 A 6/1987 Imamura
4,686,254 A 8/1987 Lochhead
4,704,272 A 11/1987 Oh
4,708,863 A 11/1987 Bews
4,726,915 A 2/1988 Verdicchio
4,788,006 A 11/1988 Bolich, Jr.
4,834,767 A 5/1989 Helioff
4,885,107 A 12/1989 Wetzel
4,898,585 A 2/1990 Borsanyi
5,034,218 A 7/1991 Duvel
5,057,153 A 10/1991 Ruggiero
5,104,646 A 4/1992 Bolich, Jr.
5,106,609 A 4/1992 Bolich, Jr.
5,106,613 A 4/1992 Hartnett
5,114,898 A 5/1992 Pinnavaia
5,154,847 A 10/1992 Lapetina
5,186,928 A 2/1993 Birtwistle
5,202,048 A 4/1993 Bartolo
5,227,156 A 7/1993 Wiese
5,248,445 A 9/1993 Rizvi
5,273,189 A * 12/1993 Jouillat ............... B05B 11/0005
222/464.5
RE34,584 E 4/1994 Grote
5,358,667 A 10/1994 Bergmann
5,360,581 A 11/1994 Rizvi
5,373,973 A * 12/1994 Foster ................. B05B 11/3011
222/530
5,462,589 A 10/1995 Nicholas
5,466,425 A 11/1995 Adams
5,478,501 A 12/1995 Rau
5,495,538 A 2/1996 Fan
5,518,774 A 5/1996 Kappock
5,540,954 A 7/1996 Nicholas
5,562,995 A 10/1996 Kappock
5,609,862 A 3/1997 Chen et al.
5,614,538 A 3/1997 Nelson, Jr.
5,674,478 A 10/1997 Dodd et al.
5,696,169 A 12/1997 Otsu
5,710,114 A 1/1998 Pyles
5,726,137 A 3/1998 Patel
5,750,122 A 5/1998 Evans
5,756,076 A 5/1998 Cervantes
5,776,444 A 7/1998 Birtwistle et al.
5,785,962 A 7/1998 Hinz
5,798,121 A 8/1998 Cauwet
5,811,487 A 9/1998 Schulz, Jr. et al.
5,836,479 A * 11/1998 Klima ................. B05B 11/0097
222/83.5
5,837,661 A 11/1998 Evans
5,853,707 A 12/1998 Wells
5,854,319 A 12/1998 Olenick, Jr.
5,874,476 A 2/1999 Hsu
5,876,705 A 3/1999 Uchiyama
5,880,076 A 3/1999 Vermeer
5,883,154 A 3/1999 Kappock
5,885,948 A 3/1999 Glenn, Jr. et al.
5,939,059 A 8/1999 Franklin
5,939,203 A 8/1999 Kappock
5,955,066 A 9/1999 Sako
5,965,515 A 10/1999 Rau
5,977,036 A 11/1999 Guskey
5,997,036 A 12/1999 Hamada
5,997,851 A 12/1999 Cox
6,017,562 A 1/2000 Kaufman
6,034,043 A 3/2000 Fujiwara
6,183,766 B1 2/2001 Sine et al.
6,303,109 B1 10/2001 Foerster
6,309,628 B1 10/2001 Ansmann
6,333,040 B1 12/2001 Boyxen
RE37,793 E 7/2002 Domenico
6,432,420 B2 8/2002 Ellis
6,451,300 B1 9/2002 Dunlop et al.
6,521,238 B1 2/2003 Muller
6,521,239 B1 2/2003 Breton
RE38,130 E 6/2003 Adams
6,598,762 B2 * 7/2003 McKune .............. B65D 83/666
222/402.1
6,719,967 B1 4/2004 Brown
6,774,096 B1 8/2004 Paye
6,878,368 B2 4/2005 Ohta et al.
6,908,912 B2 6/2005 Rioux
6,991,799 B2 1/2006 Pham et al.
7,294,611 B2 11/2007 Metrot
7,303,744 B2 12/2007 Wells
7,531,497 B2 5/2009 Midha et al.
7,560,125 B2 7/2009 Ananthapadmanabhan et al.
7,776,347 B2 8/2010 Kerschner et al.
8,252,271 B2 8/2012 Singer et al.
8,349,300 B2 1/2013 Wells
8,349,301 B2 1/2013 Wells et al.
8,349,302 B2 1/2013 Johnson et al.
8,361,448 B2 1/2013 Johnson et al.
8,361,449 B2 1/2013 Wells et al.
8,361,450 B2 1/2013 Johnson et al.
8,367,048 B2 2/2013 Wells et al.
8,470,305 B2 6/2013 Johnson
8,635,014 B2 1/2014 Jung
8,653,014 B2 2/2014 Hilvert et al.
8,655,819 B1 2/2014 Burkard et al.
8,663,612 B2 3/2014 Gamez-Garcia et al.
8,901,062 B2 12/2014 De Meirleir et al.

(56) References Cited

U.S. PATENT DOCUMENTS 8,932,569 B2 1/2015 Garrison et al.
8,940,285 B2 1/2015 Leray et al.
8,969,261 B2 3/2015 Talingting Pabalan et al.
9,005,585 B2 4/2015 Deckner et al.
9,138,429 B2 9/2015 Wise et al.
9,381,382 B2 7/2016 Schwartz et al.
9,393,188 B2 7/2016 Deckner et al.
9,539,444 B2 1/2017 Kinoshita
9,587,209 B2 3/2017 De Meirleir et al.
9,724,283 B2 8/2017 Rizk
9,877,909 B2 1/2018 Cetti et al.
10,143,632 B2 12/2018 Dihora et al.
10,226,782 B2 * 3/2019 Yamaguchi ......... B05B 11/0037
10,689,183 B2 * 6/2020 Moretti ............. B05B 11/00412
10,912,719 B2 2/2021 Gulbin
10,945,935 B2 3/2021 Brown et al.
2001/0047039 A1 11/2001 Mcmanus
2002/0119113 A1 8/2002 Ellis
2002/0131946 A1 9/2002 Pham et al.
2002/0169283 A1 11/2002 Lu
2002/0183300 A1 12/2002 Fliss
2003/0012646 A1 1/2003 Liao
2003/0017126 A1 1/2003 Mahadeshwar
2003/0044471 A1 3/2003 Sakuma
2003/0095938 A1 5/2003 Casero
2003/0119806 A1 6/2003 Lindell
2003/0130145 A1 7/2003 Patel
2003/0138497 A1 7/2003 Sakuma
2003/0171231 A1 9/2003 Shana
2003/0185779 A1 10/2003 Mitsumatsu
2003/0215522 A1 11/2003 Johnson
2003/0223952 A1 12/2003 Wells et al.
2003/0224954 A1 12/2003 Wells et al.
2003/0224955 A1 12/2003 Ribery
2004/0058855 A1 3/2004 Schwartz
2004/0092897 A1 5/2004 Macedo, Jr.
2004/0157754 A1 8/2004 Geary et al.
2004/0167114 A1 8/2004 Fliss
2004/0191331 A1 9/2004 Schwartz
2004/0197294 A1 10/2004 Seipel
2004/0223941 A1 11/2004 Schwartz
2004/0223991 A1 11/2004 Wei et al.
2004/0234471 A1 11/2004 Corbella
2004/0266886 A1 12/2004 Seipel
2005/0031569 A1 2/2005 Seipel
2005/0100570 A1 5/2005 Wei et al.
2005/0112083 A1 5/2005 Wells et al.
2005/0143268 A1 6/2005 Midha
2005/0181067 A1 8/2005 Yokoyama
2005/0196368 A1 9/2005 Laurent et al.
2005/0202984 A1 9/2005 Schwartz
2005/0267258 A1 12/2005 Rajaraman et al.
2006/0024256 A1 2/2006 Wells
2006/0024381 A1 2/2006 Schwartz
2006/0025256 A1 2/2006 Wake
2006/0045861 A1 3/2006 Bejger
2006/0078524 A1 4/2006 Midha et al.
2006/0078527 A1 4/2006 Midha et al.
2006/0079418 A1 4/2006 Wagner et al.
2006/0079419 A1 4/2006 Wagner et al.
2006/0079420 A1 4/2006 Wagner et al.
2006/0079421 A1 4/2006 Wagner et al.
2006/0205631 A1 9/2006 Smerznak et al.
2006/0250658 A1 11/2006 Jurgensen
2006/0251605 A1 11/2006 Belmar
2006/0269501 A1 11/2006 Johnson
2006/0269502 A1 11/2006 Johnson
2007/0095721 A1 5/2007 Davis et al.
2007/0110696 A1 5/2007 Johnson
2007/0110700 A1 5/2007 Wells
2007/0128147 A1 6/2007 Schwartz et al.
2007/0280976 A1 12/2007 Taylor et al.
2008/0039352 A1 2/2008 Wells et al.
2008/0096786 A1 4/2008 Holt et al.
2008/0152611 A1 6/2008 Wells
2008/0187507 A1 8/2008 Johnson
2010/0061952 A1 3/2010 Wells et al.
2010/0226868 A1 9/2010 Gamez-Garcia et al.
2010/0234260 A1 9/2010 Sekine et al.
2010/0322878 A1 12/2010 Stella et al.
2010/0330018 A1 12/2010 Lorant et al.
2011/0053818 A1 3/2011 Chuchotiros et al.
2011/0065624 A1 3/2011 Boutique et al.
2011/0067720 A1 3/2011 Ranade et al.
2011/0070180 A1 3/2011 Ranade et al.
2011/0081392 A1 4/2011 de Arruda et al.
2011/0110991 A1 5/2011 Garrison et al.
2011/0248052 A1 * 10/2011 Kelly ...................... B32B 27/12
222/325
2012/0148644 A1 6/2012 Popplewell et al.
2012/0164198 A1 6/2012 Johnson et al.
2012/0308502 A1 12/2012 Wise et al.
2012/0329768 A1 12/2012 Wise et al.
2013/0029894 A1 1/2013 Bettiol et al.
2013/0090279 A1 4/2013 Hilvert et al.
2013/0131188 A1 5/2013 Beckedahl et al.
2013/0143784 A1 6/2013 Rizk
2013/0171216 A1 7/2013 Alden-danforth et al.
2013/0174863 A1 7/2013 Marsh et al.
2013/0243717 A1 9/2013 Catalan et al.
2013/0243835 A1 9/2013 Tanner et al.
2014/0018276 A1 1/2014 Coffindaffer et al.
2014/0099276 A1 4/2014 Yang et al.
2014/0112964 A1 4/2014 Wu
2014/0162931 A1 6/2014 De Meirleir et al.
2014/0335041 A1 11/2014 Peffly et al.
2015/0010487 A1 1/2015 Snyder et al.
2015/0011450 A1 1/2015 Carter et al.
2015/0044157 A1 2/2015 Kulkarni et al.
2015/0059795 A1 3/2015 Vatter
2015/0093422 A1 4/2015 Garrison et al.
2015/0102061 A1 * 4/2015 Larson ................ B05B 11/0081
222/129
2015/0313833 A1 11/2015 Hilvert et al.
2015/0342842 A1 12/2015 Wise et al.
2015/0374609 A1 12/2015 Cetti et al.
2016/0106663 A1 4/2016 Gulbin
2016/0143827 A1 5/2016 Castan Barberan et al.
2016/0256365 A1 9/2016 Dihora et al.
2017/0216158 A1 8/2017 Deckner et al.
2017/0225183 A1 * 8/2017 Kelly ...................... B05B 15/30
2017/0333734 A1 11/2017 Mauer et al.
2017/0367955 A1 12/2017 Brown et al.
2018/0071185 A1 3/2018 Cochran et al.
2018/0098923 A1 4/2018 Hutton, III
2018/0339845 A1 * 11/2018 Moretti .................. B65D 83/42
2019/0201925 A1 7/2019 Toh et al.
2019/0290554 A1 9/2019 Yokogi et al.
2019/0290555 A1 9/2019 Yokogi et al.
2019/0290562 A1 9/2019 Yokogi et al.
2019/0290567 A1 9/2019 Yokogi et al.
2019/0290568 A1 9/2019 Yokogi et al.
2019/0307665 A1 10/2019 Yokogi et al.
2019/0365611 A1 12/2019 Brown et al.
2020/0188243 A1 6/2020 Brown et al.
2021/0022975 A1 1/2021 Cochran et al.
2021/0045979 A1 2/2021 Dunlop et al.

FOREIGN PATENT DOCUMENTS

CN 1213294 A 4/1999
CN 1568174 A 1/2005
CN 1658825 A 8/2005
CN 1658830 A 8/2005
CN 101267797 A 9/2008
CN 101965175 A 2/2011
CN 102905682 A 1/2013
CN 103458858 A 12/2013
CN 105326670 A 2/2016
CN 105395373 A 3/2016
CN 105326660 B 4/2018
CN 105395378 B 7/2018
DE 19847968 A1 4/2000
EP 0037318 A1 10/1981

(56) References Cited

FOREIGN PATENT DOCUMENTS

| | | | |
|---|---|---|---|
| EP | 0077630 | A1 | 4/1983 |
| EP | 0627216 | A2 | 12/1994 |
| EP | 1123693 | A2 | 8/2001 |
| EP | 1066024 | B1 | 10/2002 |
| EP | 1384467 | B1 | 5/2007 |
| EP | 3075681 | A1 | 10/2016 |
| FR | 2593801 | B1 | 5/1986 |
| FR | 1971709 | A1 | 8/2012 |
| FR | 2984136 | A1 | 6/2013 |
| GB | 849433 | A1 | 9/1960 |
| GB | 1582529 | A | 1/1981 |
| GB | 2177108 | B | 7/1989 |
| JP | 5209881 | A | 8/1977 |
| JP | 06134227 | A | 5/1994 |
| JP | H07179887 | A | 11/1994 |
| JP | H07118103 | A | 5/1995 |
| JP | 07258039 | A | 10/1995 |
| JP | 2001181145 | A | 7/2001 |
| JP | 2002104940 | A | 4/2002 |
| JP | 2003530446 | A | 10/2003 |
| JP | 2004262805 | A | 9/2004 |
| JP | 2004292387 | A | 10/2004 |
| JP | 2004292390 | A | 10/2004 |
| JP | 2004307463 | A | 11/2004 |
| JP | 2005022983 | A | 1/2005 |
| JP | 2005187342 | A | 7/2005 |
| JP | 2006063044 | A | 3/2006 |
| JP | 2006525232 | A | 11/2006 |
| JP | 4016238 | B2 | 9/2007 |
| JP | 2007527921 | A | 10/2007 |
| JP | 4069228 | B2 | 1/2008 |
| JP | 4129645 | B2 | 5/2008 |
| JP | 2008524263 | A | 7/2008 |
| JP | 2015512248 | A | 4/2015 |
| JP | 2016516674 | A | 6/2016 |
| WO | 9308787 | A1 | 5/1993 |
| WO | 9410973 | A1 | 5/1994 |
| WO | 9625913 | A1 | 8/1996 |
| WO | 9726854 | A1 | 7/1997 |
| WO | 9847372 | A1 | 10/1998 |
| WO | 9938489 | A1 | 8/1999 |
| WO | 9959540 | A1 | 11/1999 |
| WO | 0100149 | A1 | 1/2001 |
| WO | 0105932 | A1 | 1/2001 |
| WO | 0117492 | A1 | 3/2001 |
| WO | 0119946 | A1 | 3/2001 |
| WO | 0139735 | A1 | 6/2001 |
| WO | 02060995 | A2 | 8/2002 |
| WO | 02076422 | A1 | 10/2002 |
| WO | 2004020526 | A1 | 3/2004 |
| WO | 2004100919 | A1 | 11/2004 |
| WO | 2007031884 | A1 | 3/2007 |
| WO | 2009072027 | A2 | 6/2009 |
| WO | 2010006866 | A1 | 1/2010 |
| WO | 2010034736 | A1 | 4/2010 |
| WO | 2010111266 | A2 | 9/2010 |
| WO | 2011120799 | A1 | 10/2011 |
| WO | 2011134832 | A2 | 11/2011 |
| WO | 2012004126 | A2 | 1/2012 |
| WO | 2012175677 | A2 | 12/2012 |
| WO | 20121756821 | A2 | 12/2012 |
| WO | 2013073849 | A1 | 5/2013 |
| WO | 2016040158 | A1 | 3/2016 |
| WO | 2017088459 | A1 | 6/2017 |
| WO | 2018005453 | A1 | 1/2018 |
| WO | 2021163728 | A1 | 8/2021 |

OTHER PUBLICATIONS

All Office Actions; U.S. Appl. No. 17/184,814, filed Feb. 25, 2021.
All Office Actions; U.S. Appl. No. 17/174,713, filed Feb. 12, 2021.
Unpublished U.S. Appl. No. 17/184,814, filed Feb. 25, 2021, to Mark Anthony Brown et. al.
Unpublished U.S. Appl. No. 17/174,713, filed Feb. 12, 2021, to Mark Anthony Brown et. al.
“Herbal Essence Shampoo”, Mintel, Jun. 1, 2014, 2 pages.
“Polyelectrolyte-Micelle—Coacervation—Effect of coacervate on the properties of shampoo”, Yoshiko Kiwatari et al., J. Soc. Cosmet. Chem. Japan, vol. 38, No. 3, 2004, pp. 211-219.
Eccleston, G.M., Application of Emulsion Stability Theories to Mobile and Semisolid o/w Emulsions, Cosmetics Magazine, vol. 101, 1986, 18 pages.
Eccleston, G.M., Application of Emulsion Theory to Complex and Real Systems, International Journal of Cosmetic Science, 1985, 18 pages.
Eccleston, G.M., Formulating Cosmetic Emulsions, Cosmetics Magazine, vol. 112, 1997, 6 pages.
Eccleston, G.M., Functions of Mixed Emulsifiers and Emulsifying Waxes in Dermatological Lotions and Creams, Colloids and Surfaces, vol. 123, 1997, 14 pages.
Eccleston, G.M., Microstructural Changes During Storage of Cetostearyl Alcohol/ Polyoxyethylene Alkyl Ether Surfactants, University of Strathclyde, 1988, 20 pages.
Eccleston, G.M., Multiple Phase Oil and Water Emulsions, Journal of Cosmetic Chemists, 1990, 22 pages.
Eccleston, G.M., Structure and Rheology of Semisolid o/w Creams Containing Cetyl Alcohol/Non-ionic Surfactant Mixed Emulsifier and Different Polymers, International Journal of Cosmetic Science, 2004, 7 pages.
Eccleston, G.M., Synchrotron X-ray Investigations into the Lamellar Gel Phase Formed in Creams Prepared with Fatty Alcohols, International Journal of Pharmaceuticals, 2000, 13 pages.
Eccleston, G.M., The Influence of Fatty Alcohols on the Structure and Stability of Creams Preapred with Fatty Alcohols, International Journal of Cosmetic Science, 1982, 9 pages.
All Office Actions, U.S. Appl. No. 16/907,711.
All Office Actions, U.S. Appl. No. 15/635,633.
All Office Actions, U.S. Appl. No. 15/703,046.
All Office Actions, U.S. Appl. No. 15/728,663.
All Office Actions, U.S. Appl. No. 16/713,142.
All Office Actions, U.S. Appl. No. 16/902,629.
All Office Actions, U.S. Appl. No. 16/432,371.
All Office Actions, U.S. Appl. No. 17/326,910.
All Office Actions, U.S. Appl. No. 17/327,972.
Barry & Rowe, The Characterization by Small Angle X-Ray Scattering of a Gel with a Lamellar Structure, International Journal of Pharmaceuticals, 1989, 5 pages.
Barry & Saunders, Kinetics of Structure Build-up in Self Bodied Emulsions Stabalized by Mixed Emulsifiers, Journal of Colloid Science, vol. 41, 1972, 12 pages.
Barry, B.W., Structure and Rheology of Emulsions Stabalized by Mixed Emulsifiers, British Society of Rheology, 1970, 12 pages.
Benton et al, Phase Behavior and Network Formation in a Cationic Surfactant-Fatty Alcohol System, JAOCS, vol. 64, 1987, 12 pages.
Burgess, J.D., Practical Analysis of Complex Coacervate Systems, Journal of Colloid Science, vol. 140, 1990, 10 pages.
CTFA Cosmetic Ingredient Dictionary, 1982, 3rd Edition, The Cosmetic, Toiletry & Fragrance Association, Inc., Washington, DC (book not included).
Database WPI Week 201634Thomson Scientific, London, GB;AN 2016-184949XP002798128,& CN 105 395 373 A (Cuongqing Pellets Coltd) Mar. 16, 2016 (Mar. 16, 2016)abstract, 3 pages.
Database WPI Week 201644Thomson Scientific, London, GB;AN 2016-14284BXP002798127,& CN 105 326 660 A (Chongqing Pellets Colid) Feb. 17, 2016 (Feb. 17, 2016)abstract, 3 pages.
Encyclopedia of Polymer Science and Engineering, John Wiley & Sons, vol. 15, 1989 (book not included).
Griffin, W.C., Calculation of HLB Values of Non-Ionic Surfactants, Journal of the Society of Cosmetic Chemists; 1954. vol. 5, pp. 249-235.
Korhonen et al, Rheological Properties of Three Component Creams Containing Sorbitan Monoesters as Surfactants, International Journal of Pharmaceuticals, 2002, 12 pages.
Louden et al, A Preliminary Examination of the Structure of Gels and Emulsions Containing Cetostearyl Alcohol, International Journal of Pharmaceuticals, 1985, 12 pages.

(56) References Cited

OTHER PUBLICATIONS

McCutcheon, Emulsifiers and Detergents, MC Pub Company, 1989 (book not included).
Meirleir Niels De et al., "The rheological properties of hydrogenated castor oil crystals", Colloid & Polymer Science, Springer Verlag, Heidelberg, DE, vol. 292, No. 10, Jun. 12, 2014, pp. 2539-2547.
Momentive SFE839 product brochure, https://www.momentive.com/products/showtechnicaldatasheet.aspx?id=14443, 4 pagesavailable Sep. 2008; accessed Jul. 17, 2015.
Noll, W., Chemistry and Technology of Silicones, Academic Press, 1968 (book not included).
Patel et al, Properties of Cetrimide / Cetostearyl Alcohol Ternary Gels; Preparation Effects, International Journal of Pharmaceuticals, 1985, 6 pages.
Savic et al, Colloidal Microstructure of Binary Systems and Model Creams Stablized with an Alkylpolyglucoside Emulsifier, Colloid Polymer Science, vol. 283, 2004, 13 pages.
Saxton, C., Antiplaque Effects and Mode of Action of a Combination of Zinc Citrate and a Nonionic Antimicrobial Agent, Scandinavian Journal, vol. 96, 1988, 7 pages.
Suzuki et al, Secondary Droplet Emulsion: Mechanism & Effects of Liquid Crystal Formation in o/w Emulsion, Journal of Dispersion Science, 1984, 24 pages.
Unpublished U.S. Appl. No. 17/326,910, filed May 21, 2021, to Howard David Hutton.
Unpublished U.S. Appl. No. 17/327,972, filed May 24, 2021, to Howard David Hutton.
Van Cutsem, Journal of the American Academy of Dermatology, XP-002288119, 1998, 6 pages.
Van Oss, C.J., Coacervation, Complex Coacervation and Flocculation, Journal of Dispersion Science, vol. 9, 1989, 14 pages.
Yoon et al, A Study of Gel Structure in the Nonionic Surfactant / Cetostearyl Alcohol / Water Ternary Systems by Differential Scanning Calorimeter, Journal of Dispersion Science, 1999, 20 pages.
De Meirleir et al. "Journal of Crystal Growth" 2013; 383: 51-56. (Year: 2013).

* cited by examiner 73
110
90

70
4J
110

70
72
110
14

50
115
55
10
11
110

BOTTLE ADAPTED FOR STORING A LIQUID COMPOSITION WITH AN AESTHETIC DESIGN SUSPENDED THEREIN

FIELD OF THE INVENTION

The present invention is directed towards a bottle that is adapted for storing a liquid composition with an aesthetic design suspended therein and more particularly a bottle with a shipping configuration, which includes an insert, and a usage configuration, which includes a pump.

BACKGROUND OF THE INVENTION

Some consumers want a beauty care product that is effective and has a striking appearance on the store shelf, and webpage/app. In some examples the beauty care product with a striking appearance can be a clear shampoo with an aesthetic design, such as a swirl or other pattern, suspended therein.

Consumers may also want their beauty care product stored in a container with a pump dispenser. Pump dispensers are affordable and make it easy to control the amount of product dispensed. Furthermore, pumps may be consumer preferred over bottles and tubes for beauty care products, particularly in shampoo, conditioner, and/or body wash products that are used in the shower. Consumers tend to buy these products in larger bottles (e.g ≥300 mL) that can be awkward to dispense in the shower if packaged in a bottle or tube because consumers only have one hand to squeeze and hold the container while dispensing the product into the opposite hand or into a sponge, shower puff, loofa, wash cloth or other cleaning implement that is held in the opposite hand.

Once the aesthetic design is suspended in a beauty care product, it can be difficult to preserve the design throughout distribution channels, including shipping, handling, and storage at home, storage facility, and/or store shelves. Any air present in the container, including headspace, air trapped in a dip tube or pump, or even small bubbles that generally occur when the container is filled, can travel through the design and destroy portions of it when the container is tipped, inverted, and/or jostled during shipping and handling.

Currently, there are barrier packaging solutions that could maintain an aesthetic design in a shampoo product, such as certain aerosols (commercially available from Airopack®, the Netherlands, which sells aerosol dispensers that use compressed air instead of chemical propellant) and airless pumps (such as Ultra Jumbo from YONWOO®, Incheon, Korea). However, there are several drawbacks to barrier packaging. First, using an aerosol dispenser may not be consumer preferred for this application, since this requires a consumer habit change as the product dispenses continuously, as opposed to discrete pumps. Aerosols also need to comply with country specific regulations. Additionally, the maximum size of an aerosol is limited by the largest piston diameter and in the Airopack® 40% of the container is dead volume filled with the compressed air. Since consumers tend to buy shampoo in relatively large quantities (e.g. <300 mL), an Aeropack® dispenser that accommodates this volume would be ergonomically difficult to use. The Ultra Jumbo from YONWOO is the largest airless pump. However, the maximum size is only 300 mL, which does not meet consumer demand for sizes >300 mL. Also, the filling process for the Ultra Jumbo is difficult to scale up and prone to overflowing. Furthermore, the Ultra Jumbo is vulnerable to air void in the headspace, which would disturb the design suspended in the shampoo.

Therefore, there is a need for a container with a pump dispenser that stores flowable, liquid beauty care products with a suspended aesthetic design without interrupting the design during shipping, handling, and/or storage.

SUMMARY OF THE INVENTION

Packaging comprising: (a) an insert with an insert wall defining a hollow interior and a lip defining an opening and a pierceable membrane distal to the opening; (b) a bottle defining a hollow interior and a neck defining an opening through which at least a portion of the insert is receivable into the hollow interior; (c) an overcap detachably secured to the neck, the overcap comprising a plug portion that is receivable into the hollow interior of the insert.

A pump dispenser comprising: (a) an insert with an insert wall defining a hollow interior and a lip defining an opening and a pierced membrane distal to the opening; (b) a bottle defining a hollow interior and a neck defining an opening through which at least a portion of the insert is receivable into the hollow interior; (c) a pump comprising a dip tube and a pump assembly wherein the dip tube is fluidly connected to the pump assembly and wherein the dip tube is receivable into the hollow interior of the insert and extends through the pierced membrane.

A method for preserving the suspended design in a liquid product: (a) providing a bottle defining a hollow interior and a neck defining an opening; (b) filling the bottle with a liquid beauty care product to a target fill level with a headspace and suspending a design in the liquid beauty care product; (c) inserting an insert through the opening into the hollow interior until the insert has a snap fit with the neck; wherein the insert comprises holes; wherein immediately after the insert is inserted and the headspace is less than 2%; wherein a portion of liquid composition enters the hollow interior of the insert through the holes; attaching an overcap to the neck wherein the overcap comprises a plug portion extending into the hollow insert interior and sealing the holes: wherein the design is substantially unchanged following the Ship Test and the bottle comprises the liquid product comprising a maintained suspended design.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

Most liquid beauty products are sold in containers that have appreciable headspace. During shipping and handling the air from the headspace travels through the liquid product. In traditional liquid beauty products, this is not a problem because the product is uniform. However, in a product with a suspended design, the air from the headspace travels through the liquid product, destroying the design, making the product look sloppy and cheap.

One way to eliminate headspace is by overfilling bottles, especially on a large scale at a high-speed packaging facility, is messy and can be wasteful. When bottles are overfilled, the liquid product will spill over onto the bottles and packaging line. Everything will have to be washed and sudsy shampoo and body wash and/or the residue from conditioner can be difficult to remove. Alternatively, the bottles can be topped off by hand, which is not practical at a large scale.

Figure 1A:
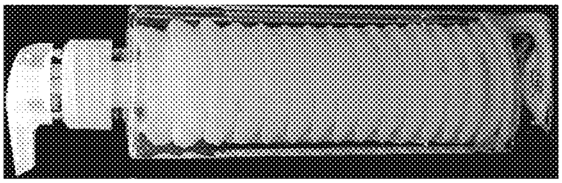
FIG. 1A is photograph of a bottle with a pump, immediately after filling with a liquid shampoo product with a decoration suspended therein.
Figure 1B:
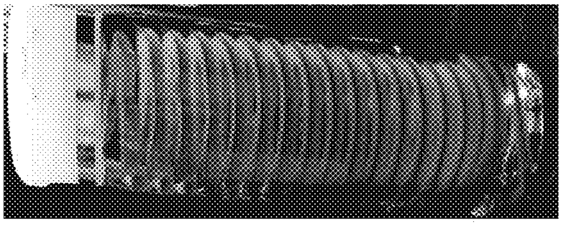
FIG. 1B is a photograph of a bottle with a cap closure immediately after filling with a liquid shampoo product with a decoration suspended therein.

Even if overfilling bottles was practical, was found that it is not effective when the bottle has a pump. FIG. 1A is a photograph of a bottle with a pump, immediately after filling with a liquid shampoo product with a decoration suspended therein. This bottle was overfilled to ensure that once the pump was inserted, there would be substantially no headspace. FIG. 1B is a photograph of a bottle with a cap closure immediately after filling with a liquid shampoo product with a decoration suspended therein. Like FIG. 1A, the bottle in FIG. 2A was overfilled so there was substantially no headspace.

After the bottles in FIGS. 1A and 1B were filled and closed, photographs were taken and the bottles were subjected to sequence 3, 4, and 5, which correspond to Test Blocks 2 (shock-drop #1), 3 (vibration under dynamic load), 4 (shock: second sequence (drop)) respectively, of the ISTA® 6A Ship Test (6-Amazon.com-Over Boxing, April 2018 was performed using the ASTM setup) (hereinafter "Ship Test"). This test is a general simulation test for e-Commerce fulfillment.

Figure 1C:
FIG. 1C is a photograph of the bottle of FIG. 1A, after the Ship Test (ISTA 6A)
Figure 1D:
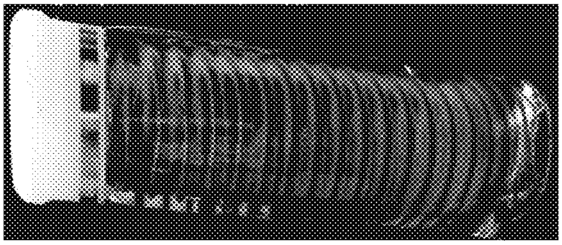
FIG. 1D is a photograph of the bottle of FIG. 1B, after the Ship Test (ISTA 6A)

Before conducting this test, it was hypothesized that the suspended design in both the bottle with the pump (FIG. 1A) and the bottle with the cap (FIG. 1B) would remain substantially unchanged after the Ship Test. FIGS. 1C and 1D are photographs that were taken immediately following the Ship Test of the bottles in FIGS. 1A and 1B, respectively. FIG. 1D looks similar to FIG. 1B. However, FIG. 1C looks quite different than FIG. 1C. As shown in the circled area of FIG. 1C, the suspended design is substantially damaged. If this bottle were sold, the suspended design which is supposed to be visually appealing and connotate a high-quality effective product, instead looks cheap.

It was determined that the bottle with the cap (FIGS. 1B and 1D), does not have any air that forms during the ship test and therefore the suspended design is substantially unchanged during the Ship Test. However, the Ship Test identified that when a pump is present (FIGS. 1A and 1C), air can be introduced into the bottle during shipping, even when the bottle is overfilled so there is substantially no headspace. The air is problematic because the air bubbles can travel through the liquid product and disrupting the suspended design.

The Ship Test identified that when a bottle is closed by a pump, air will enter the bottle though the pump when it is tipped, inverted, and/or jostled during shipping and handling, either directly to the consumer or to a retailer. The Ship Test also showed that when air is present during shipping and handling, it can significantly disrupt the design.

It was found that in order to limit the amount of air that enters the bottle during shipping, an insert that can have a snap fit with the neck of the bottle and an overcap can reduce the amount of air in the bottle during shipping. Immediately following insertion of the insert the bottle has less than 5% headspace, alternatively less than 3%, alternatively less than 2%, alternatively less than 1%, alternatively less than 0.5%, and alternatively less than 0.2%. In some examples, immediately following insertion of the insert the bottle has substantially no or no headspace.

It is difficult to reduce all the air that is trapped in the beauty care product. After filling, typical beauty care products can have about 4% air, trapped in tiny bubbles that are not visually discernable. When the shampoo is packed in a typical bottle or pump, over time, these bubbles combine into larger bubbles due to Laplace pressure. These larger bottles will ultimately rise to the headspace if the liquid beauty care product's stress is not high enough to support the density difference between air and liquid. So even if the liquid beauty care product is packed in a bottle without any visible bubbles, a headspace can form within 24 to 48 hours. Increasing the liquid beauty product yield stress can stop bubbles migrating from small to larger bubbles and to the headspace, however a product with high yield stress have lower acceptance with consumers due to lower spreadability and difficult dispensing. As discussed herein, air bubbles, especially large air bubbles, and a headspace can destroy a suspended design during shipping and handling.

It was found that when the overcap was screwed or snapped onto the neck of the bottle, there was a slight over-pressure, which stopped the bubble migration without compromising yield stress.

A bottle can pass the Ship Test if after performing sequence number 1-5 of the ISTA® 6A (6-Amazon.com-Over Boxing, April 2018 using the ASTM setup for all tests) the suspended design is substantially intact. As used herein, substantially intact can mean a human viewer cannot visually discern one or more large areas where the suspended design is disturbed with the unaided eye (excepting standard corrective lenses adapted to compensate for near-sightedness, farsightedness, or astigmatism, or other corrected vision) in lighting at least equal to the illumination of a standard 100-watt incandescent white light bulb at a distance of approximately 1 foot (0.30 m).

In some examples, the pattern disruption can be assessed by a taking a cross section of the liquid beauty product and determining what % of the cross section is disrupted. Less than 10% of the area of the cross section can be disrupted, alternatively less than 7%, alternatively less than 5%, alternatively less than 3%, and alternatively less than 1%.

After shipping and handling, the overcap can be removed and the pump can be inserted through a membrane of the insert.

Figure 2B:
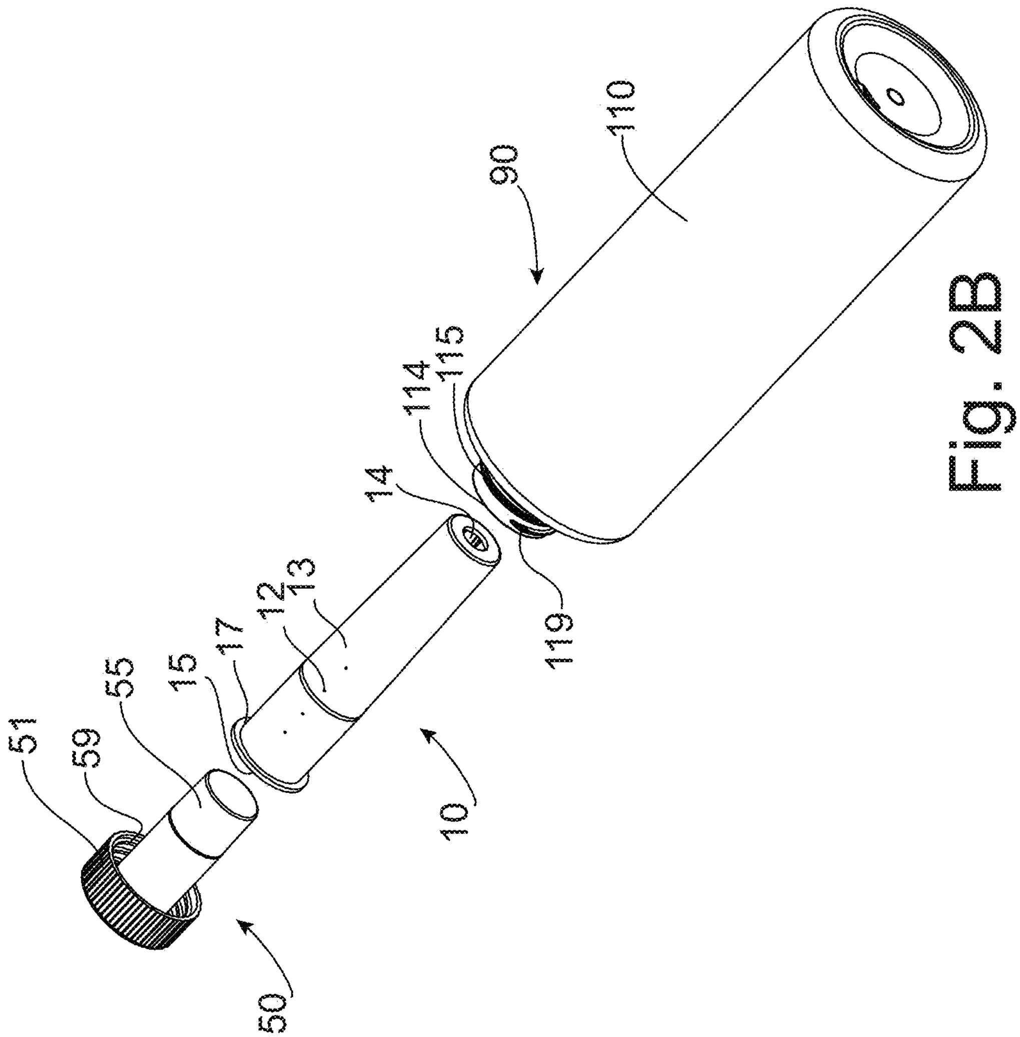
FIG. 2B is an exploded view of the embodiment in FIG. 2A.
Figure 2A:
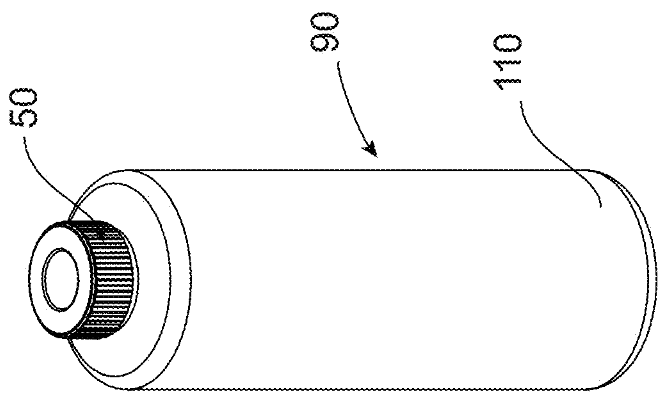
FIG. 2A is a perspective view of an embodiment in the shipment configuration.
Figures 4A, 4B, 4C, 4D:
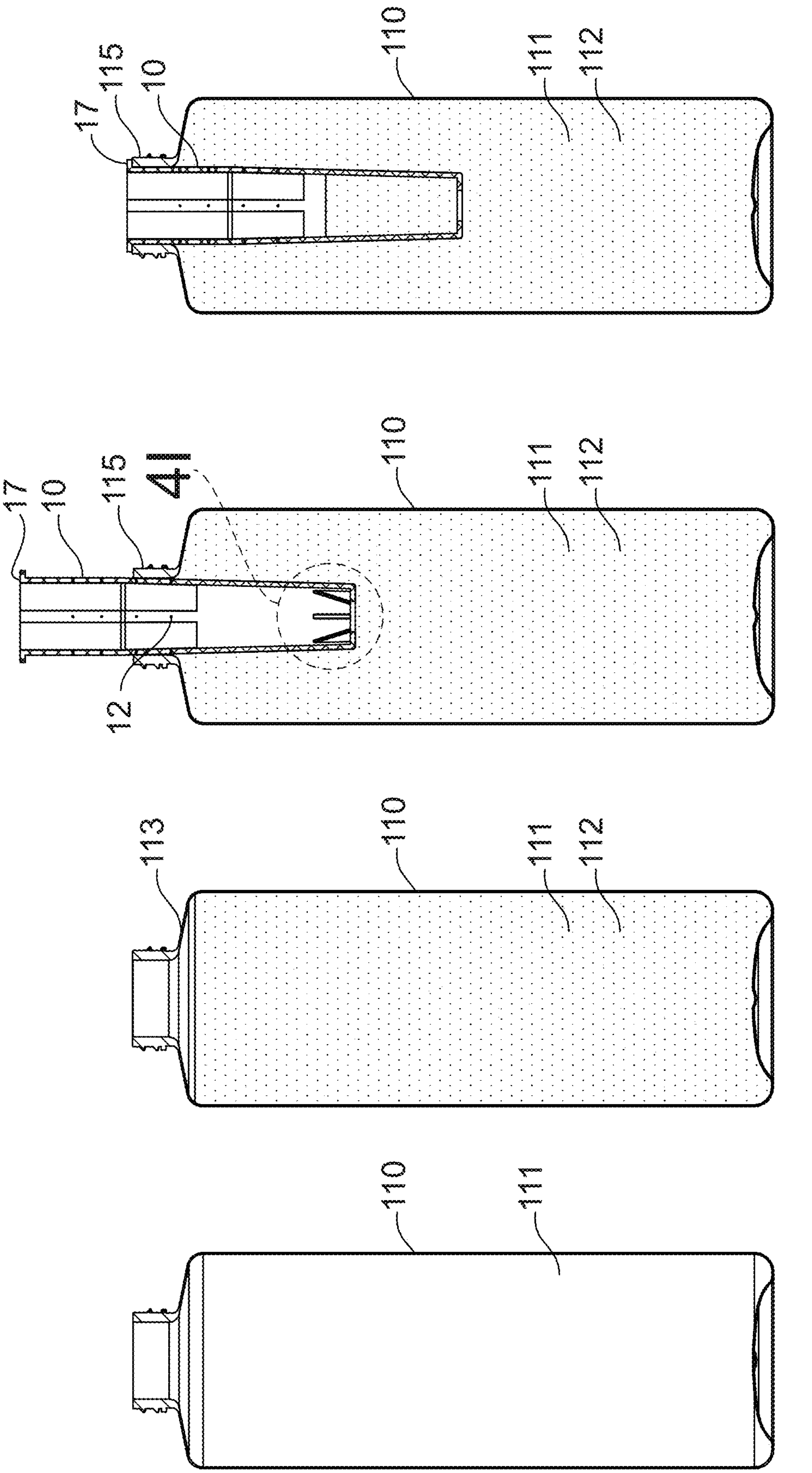
FIG. 4A is a cross-sectional view of an empty bottle.
FIG. 4B is a cross-sectional view of the bottle filled with a liquid product.
FIG. 4C is a cross-sectional view of the bottle with an insert partially placed onto the bottle.
FIG. 4D is a cross-sectional view of the bottle where the insert is placed on the neck of the bottle.

FIGS. 2A and 2B show package 90, which is adapted for storing a liquid product with a design suspended therein. In the shipment configuration, as shown in FIGS. 2A and 2B, package 90 can comprise bottle 110 defining a hollow interior and opening 114 through which at least a portion of the insert 10 is receivable into the hollow interior. The bottle may have a volume between about 200 mL and about 1500 mL, alternatively about 300 mL to about 1000 mL, and alternatively from about 500 mL to 1000 mL. The opening 114 may have a width (diameter, in the illustrated example) great enough to facilitate filling of the hollow interior with a product to be dispensed using a pump. Such a width is preferably greater than or equal to 30 millimeters and less than or equal to 100 millimeters, alternatively less than or equal to 75 mm, alternatively less than or equal to 50 mm, and alternatively less than or equal to 25 mm. Insert 10 can have a snap fit with bottle 110, in particular, insert 10 can have lip 17 that has a snap fit with the top edge of neck 115 (as shown in FIG. 4D, described hereafter).

In the shipment configuration, shown in FIGS. 2A and 2B, package 90 includes overcap 50. Overcap 50 can be detachably secured to the bottle 110 by rotating the lid 51 relative to the bottle 110 while mating the male screw thread 119 of the bottle 110 with the female screw 59 of the lid 51. Overcap 50 comprises plug portion 55, which can be permanently joined to the underside of the lid.

Insert 10 can have a hollow interior and open end 15 through which at least a portion of plug portion 55 is receivable into the hollow interior of the insert. Plug portion 55 may not extend all the way to membrane 14 and the base of the insert. Plug portion 55 can extend to cover all of the holes 12 in the insert. Plug 14 can form a seal inside the insert.

Insert 10 can comprise one or more holes 12 that extend from insert outer wall 13 through insert inner wall. The holes allow liquid product to seep into the hollow interior of the insert when it is inserted through the neck of the bottle, preventing the bottle from overflowing and having virtually no headspace. In one example the holes can be from about 0.001 in. (25.4 μm) to about 0.1 in. (2540 μm) in diameter, alternatively from about 0.005 in. (127 μm) to about 0.06 in. (1524 μm), alternatively from about 0.008 in. (203.2 μm) to about 0.04 in. (1016 μm), and alternatively from about 0.01 in. (254 μm) to about 0.02 in. (508 μm). The holes can vary in number, spacing and position. The insert can contain one hole, alternatively from about two holes to about 10 holes, alternatively from about two holes to about 7 holes, and alternatively from about two holes to about four holes. The insert can have holes on one side, as shown in FIG. 2B, or the insert can have holes in more than one location around the circumference of the insert. The holes can be evenly spaced, or they can be randomly spaced.

Figure 3B:
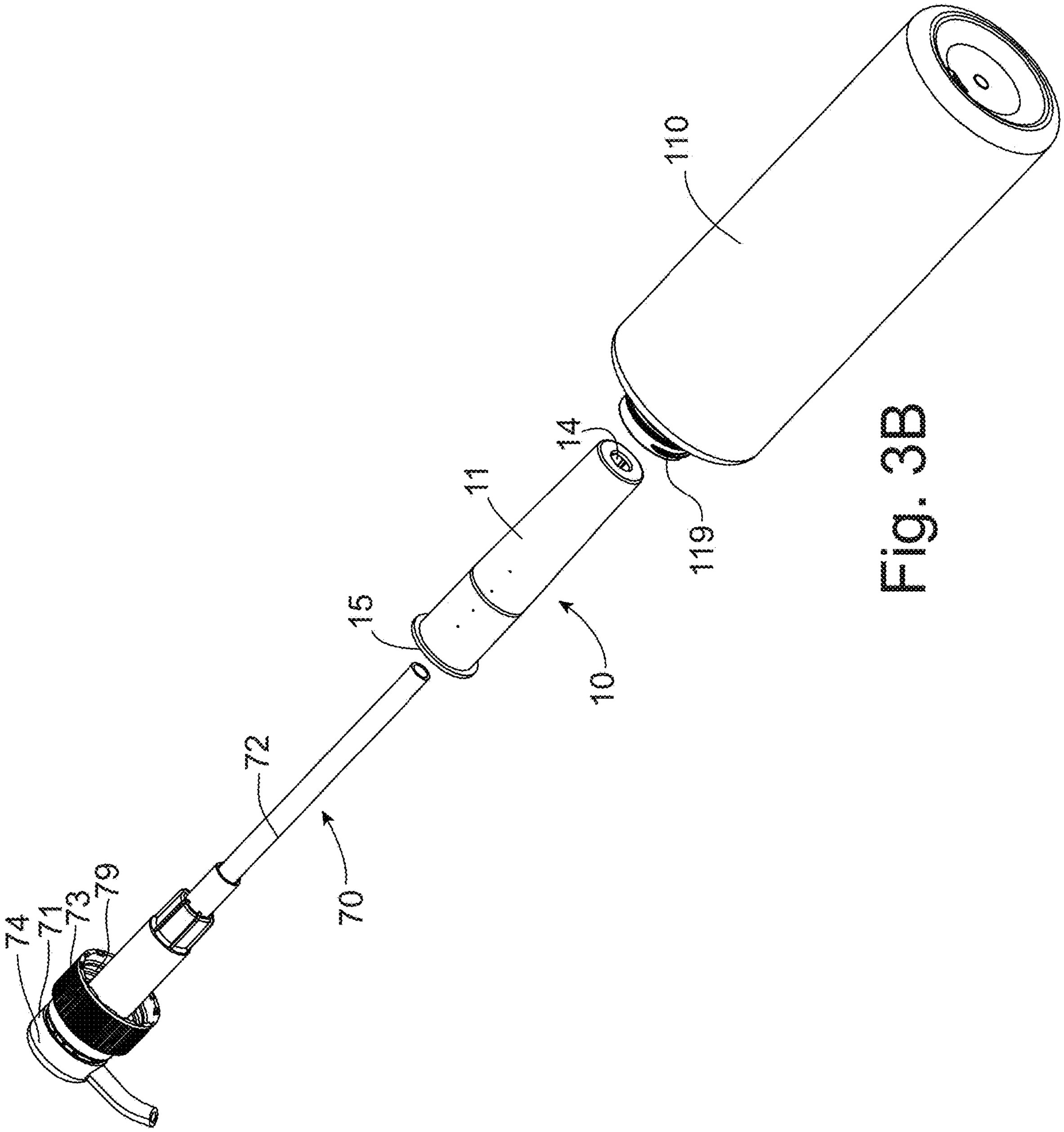
FIG. 3B is an exploded view of the embodiment in FIGS. 2A-B.
Figure 3A:
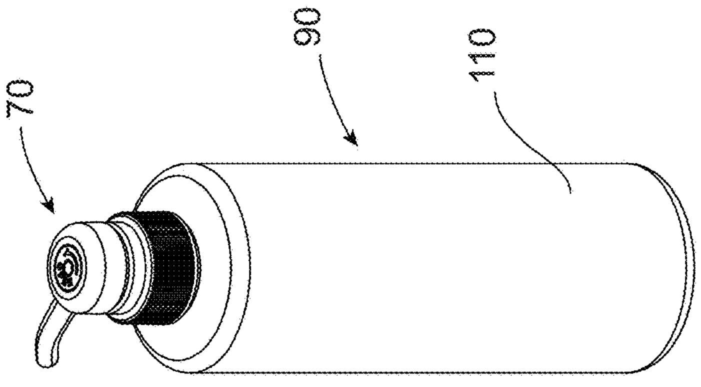
FIG. 3A is a perspective view of the embodiment in FIGS. 2A-B in the usage configuration.

FIGS. 3A and 3B show the usage configuration for package 90, with pump 70 that can be used for dispensing a liquid product from the package. Pump 70 can comprise dip tube 72 and pump assembly 71. The dip tube 72 and the pump assembly 71 can be separate parts, which are assembled to form pump dispenser. Alternatively, dip tube 72 and the pump assembly 71 can be one part.

In the usage configuration, shown in FIGS. 3A and 3B, pump 70 includes closure 73. Closure 73 can be detachably secured to the bottle 110 by rotating the closure 73 relative to the bottle 110 while mating the male screw thread 119 of the bottle 110 with the female screw 79 of the closure 73.

In the embodiment showed in FIGS. 3A and 3B, the overcap is removed before the pump is attached. In other embodiments, the overcap may be pierceable by the dip tube and may not need to be removed. The pump can be assembled by the end-user or the store before putting the package on the store shelf. Alternatively, the pump can be reusable, and a user can buy a new package that can comprise a bottle, insert, and overcap at the store and attach the reusable pump before use.

Insert 10 can comprise insert body 11 defining a hollow interior and open end 15 through which at least a portion of pump 70, in particular dip tube 72, is receivable into the hollow interior of the insert. When inserted, dip tube 72 is guided in contact with the membrane 14 through some ribs or fins placed at the bottom of the insert body 11. In this configuration the consumer can press on top on the pump thus causing the dip tube to pierce the membrane 14, thereby allowing the dip tube to be in fluid communication with the liquid stored in the bottle. Then the consumer secures the pump to the bottle. Then the consumer can discharge liquid product by pumping the actuator 74. Membrane 14 can be located at an end of insert 10, distal to insert open end 15.

Bottle 110 can be transparent or translucent so the user can see the design suspended in the product from the exterior of bottle 110. Alternatively, bottle 110 can be opaque and can optionally have one or more transparent or opaque windows where the consumer can see the suspended design.

Bottle, overcap, and insert can be made from the same material or different materials. It can be desirable to have the bottle, insert, and optionally the overcap can be made from the same material or a material combination so it can be more easily recycled. The bottle, insert, and/or the overcap can by polymeric, and particularly substantially or entirely comprise polyethylene terephthalate (PET), polypropylene (PP), polyethylene (PE), and/or polyethylene naphthalate (PEN). In one example, the bottle can be made of polyethylene terephthalate (PET), while the insert and the over-cap can be made of polypropylene (PP). In another example the bottle, insert, and/or the overcap can be made from sustainable materials and/or combinations and blends of sustainable and other materials including, but not limited to polylactic acid (PLA), polyglycolic acid (PGA), polybutylene succinate (PBS), an aliphatic-aromatic copolyester optionally with high terephthalic acid content, an aromatic copolyester optionally with high terephthalic acid content, polyhydroxyalkanoate (PHA), thermoplastic starch (TPS) and mixtures thereof. Suitable materials are disclosed in commonly assigned U.S. Pat. No. 8,083,064.

Figures 4E, 4F, 4G, 4H:
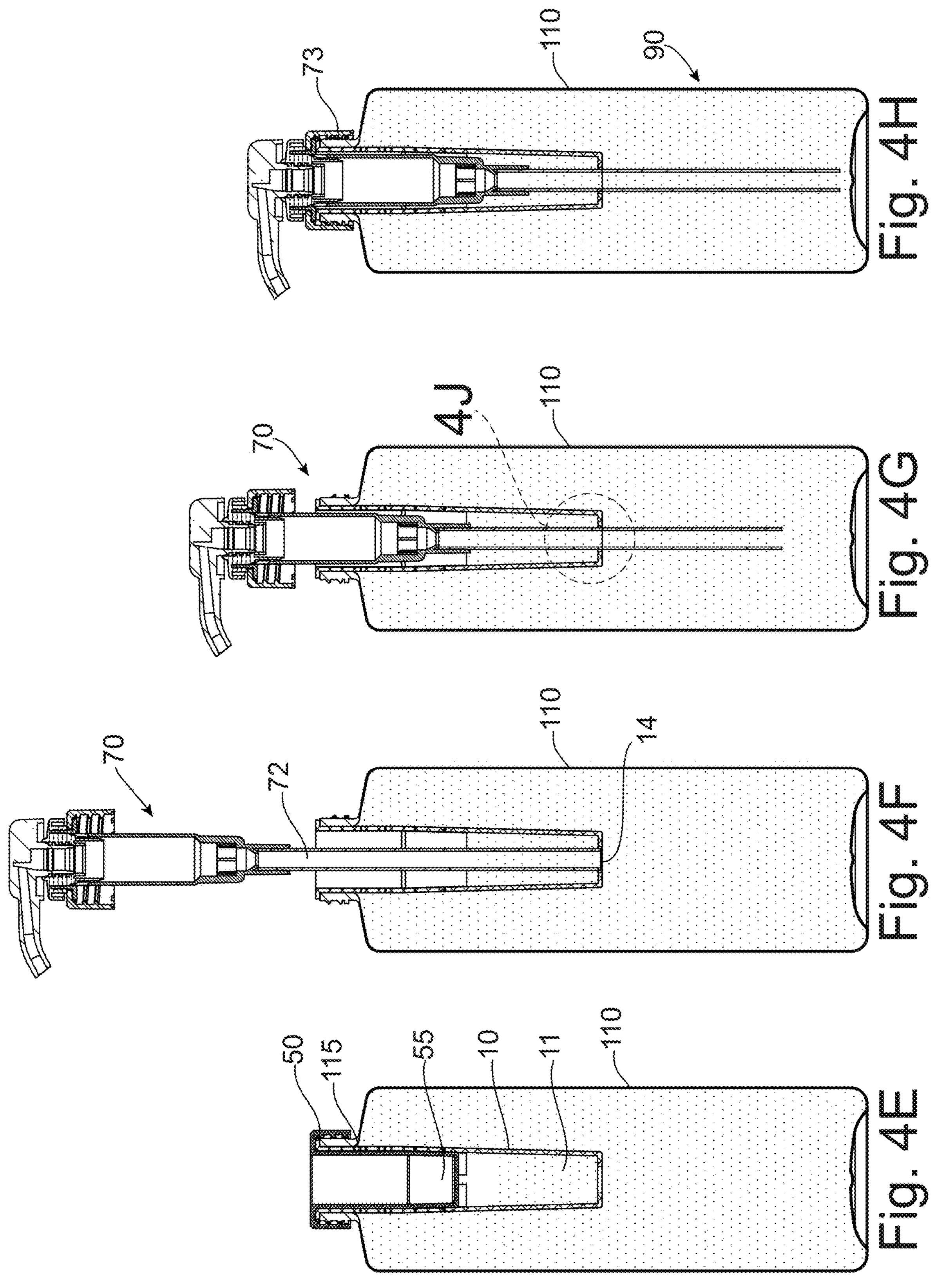
FIG. 4E is a cross-sectional view of the bottle with an overcap screwed on the bottle (referred to herein as the shipment configuration)
FIG. 4F is a cross-sectional view of the bottle where the overcap is removed, and the dip tube is partially placed into the insert.
FIG. 4G is a cross-sectional view of the bottle where the pump is assembled on the top of the neck and the dip tube has pierced the membrane.
FIG. 4H is a cross-sectional view of the bottle where the pump is screwed onto the bottle and the product is ready for use.

FIGS. 4A to 4H are cross-sectional views of the package or portions thereof that show the steps to assemble the shipment configuration and the usage configuration for the embodiments shown in FIGS. 2A, 2B, 3A, and 3B. The steps are as follows:

- Step 1: provide an empty bottle. FIG. 4A, is a cross-sectional view of bottle 110 with hollow interior 111.
- Step 2: fill empty bottle with liquid product to a target fill volume. FIG. 4B is a cross-sectional view of bottle 110 where hollow interior 111 is filled with liquid product 112. Hollow interior 111 is not completely filled with the liquid product 112 and therefore the hollow interior 111 has headspace 113. Liquid product 112 includes a design suspended therein.
- Step 3: Place insert through neck and into the hollow cavity. FIG. 4C is a cross-sectional view of bottle 110 with insert 10 which is place through neck 115 into hollow interior 111. In FIG. 4C, insert 110 is not fully inserted and product 112 starts to move into the headspace.
- Step 4: insert placed on neck. FIG. 4D is a cross-sectional view of bottle 110 where insert 10 is fully inserted into hollow interior 111 through neck 115. Insert 10 can have a snap fit with bottle 110. In one example, neck 115 can engage with insert 10, including lip 17 engaging with neck 115. As shown in FIG. 4D, product 112 enters the insert through holes 12 during this step and the headspace in the bottle can be substantially eliminated. Eliminating the headspace can be important to prevent air bubbles from destroying the design suspended in the liquid product.
- Step 5: Attach the overcap on bottle. FIG. 4E is a cross-sectional view of bottle 110 with overcap 50 detachably secured to the neck 115 of bottle 110. In this configuration, plug portion 55 extends into hollow interior 11 of insert 10. Plug portion 55 extends past the holes, forming a seal that prevents liquid product from entering or exiting the insert's hollow interior. FIG. 4E shows the shipment configuration. The package can be in the shipment configuration anytime during transport including when it is being shipped to stores or directly to consumers. If steps 1-4 are preformed correctly, the suspended design may be substantially intact following the Ship Test.
- Step 6: Remove the overcap and begin inserting the pump through the hollow cavity of the insert, dip tube first. In FIG. 4F, the overcap is removed. FIG. 4F shows pump 70 being inserted dip tube 72 first through insert 10. In FIG. 4F, membrane 14 has not been pierced.
- Step 7: Continue inserting the pump and pierce the membrane. FIG. 4G shows pump 70 after piercing the membrane.
- Step 8: Attach closure to bottle and then the pump dispenser package is ready for its first use. In FIG. 4H, closure 73 is secured to bottle 110. Dip tube 72 is near the base of bottle 110 and dispenser package 90 is ready for its first use.

Figure 4I:
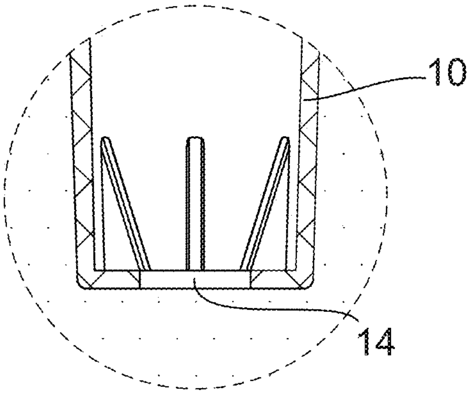
FIG. 4I is an enlarged cross-section view of the membrane of FIG. 4C.

FIG. 4I is an enlarged cross-section view of membrane 14, as shown in FIG. 4C. In this example, membrane 14 is assembled at the bottom of insert 10 such that the membrane can fully cover the hole at the bottle on the insert. The membrane can be made of aluminum foil and can be made of 20 microns hard aluminum foil using similar specifications of what is being used in push through blister packages. The membrane can be assembled to the insert either by using an adhesive or a heat-seal coating or other assembly technique known. If heat sealing is used, the membrane can include a layer to promote a strong seal. The heat-sealing layer can include a low-density polyethylene (LDPE). Alternatively, the membrane can be made of other materials that can be easy to pierce. As an example, the aluminum can be substituted with a PET layer. In another example, the membrane can be also formed directly on the insert by injection molding. In yet another example, the membrane thickness is 0.3 mm. In another example, the membrane is molded with some V-shaped grooves to weaken its structure to decrease the piercing force. The membrane can survive the ship test.

Figure 4J:
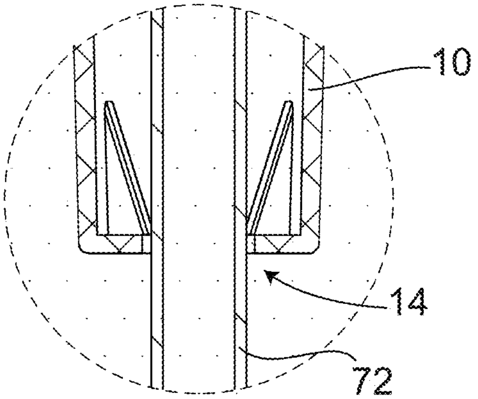
FIG. 4J is an enlarged cross-section view of the membrane of FIG. 4G.

FIG. 4J is an enlarged cross-section view of membrane, as shown in FIG. 4G. In this example, the thin membrane 14 is pierced by dip tube 72 during pump insertion.

Figure 5B:
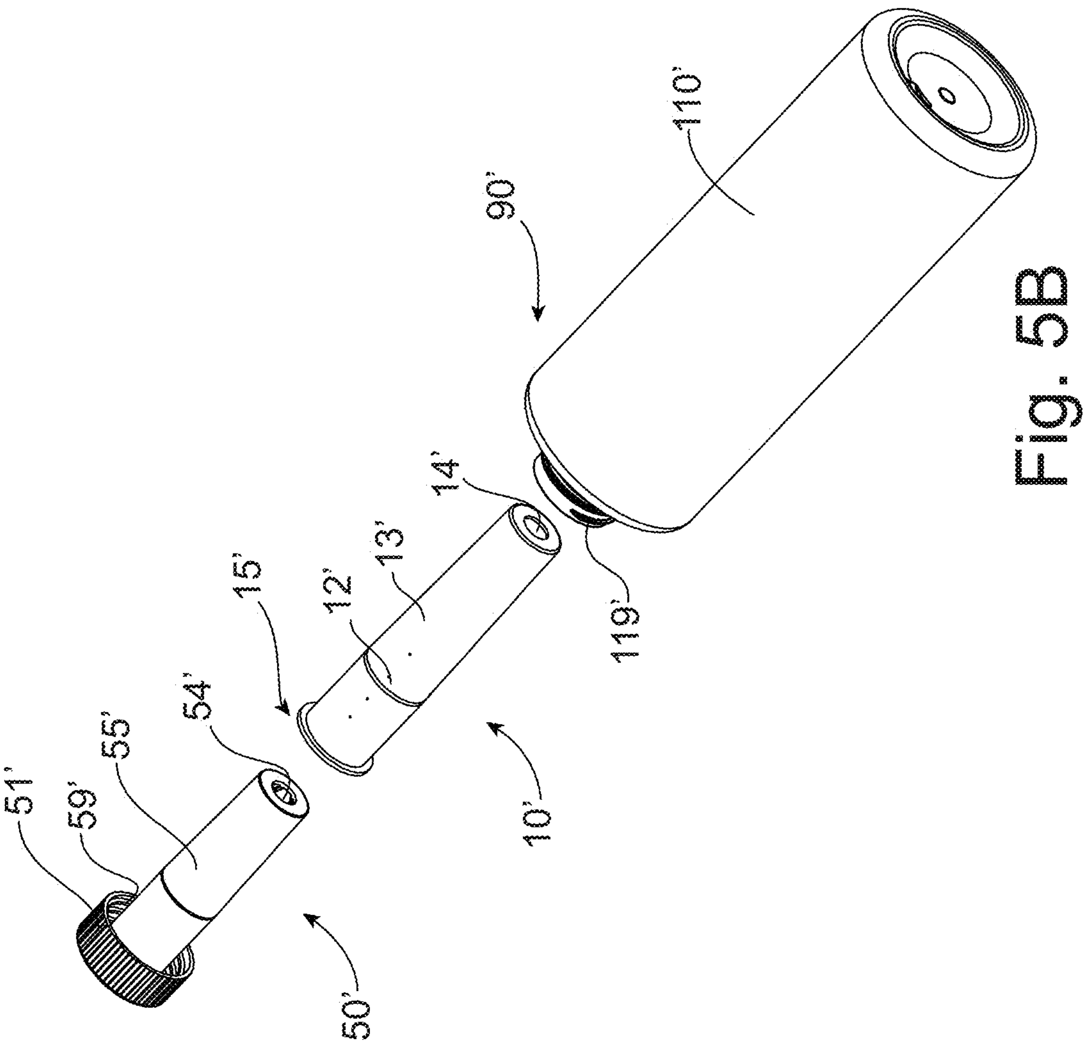
FIG. 5B is an exploded view of the second embodiment in FIG. 5A.
Figure 5A:
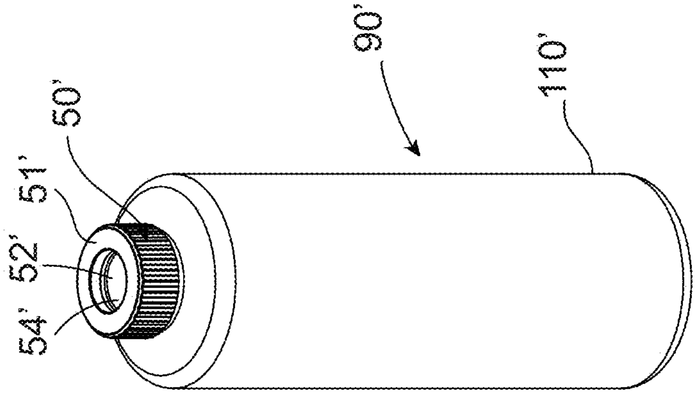
FIG. 5A is a perspective view of a second embodiment in the shipment configuration.

FIGS. 5A and 5B show package 90', which is adapted for storing a liquid product with a design suspended therein. In the shipment configuration, as shown in FIGS. 2A and 2B, package 90' can comprise bottle 110' defining a hollow interior and opening 114' through which at least a portion of the insert 10' is receivable into the hollow interior.

In the shipment configuration, shown in FIGS. 5A and 5B, package 90' includes overcap 50'. Overcap 50' can be detachably secured to the bottle 110' by rotating the lid 51' relative to the bottle 110' while mating the male screw thread 119' of the bottle 110' with the female screw 59' of the lid 51'. Overcap 50' comprises plug portion 55', which can be permanently joined to the underside of the lid. In this embodiment, plug portion 55' can have a membrane 54' distal to lid 51'. Overcap 50' can have an opening 52' in lid 51' that can expose membrane 54'.

Insert 10' can have a hollow interior and open end 15' through which at least a portion of plug portion 55' is receivable into the hollow interior of the insert. Plug portion 55' may not extend all the way to membrane 14' and the base of the insert. Plug portion 55 can extend to cover all of the holes in the insert. Plug 14 can form a seal inside the insert.

Insert 10' can comprise one or more holes 12' that extend from insert outer wall 13' through insert inner wall.

Figure 6B:
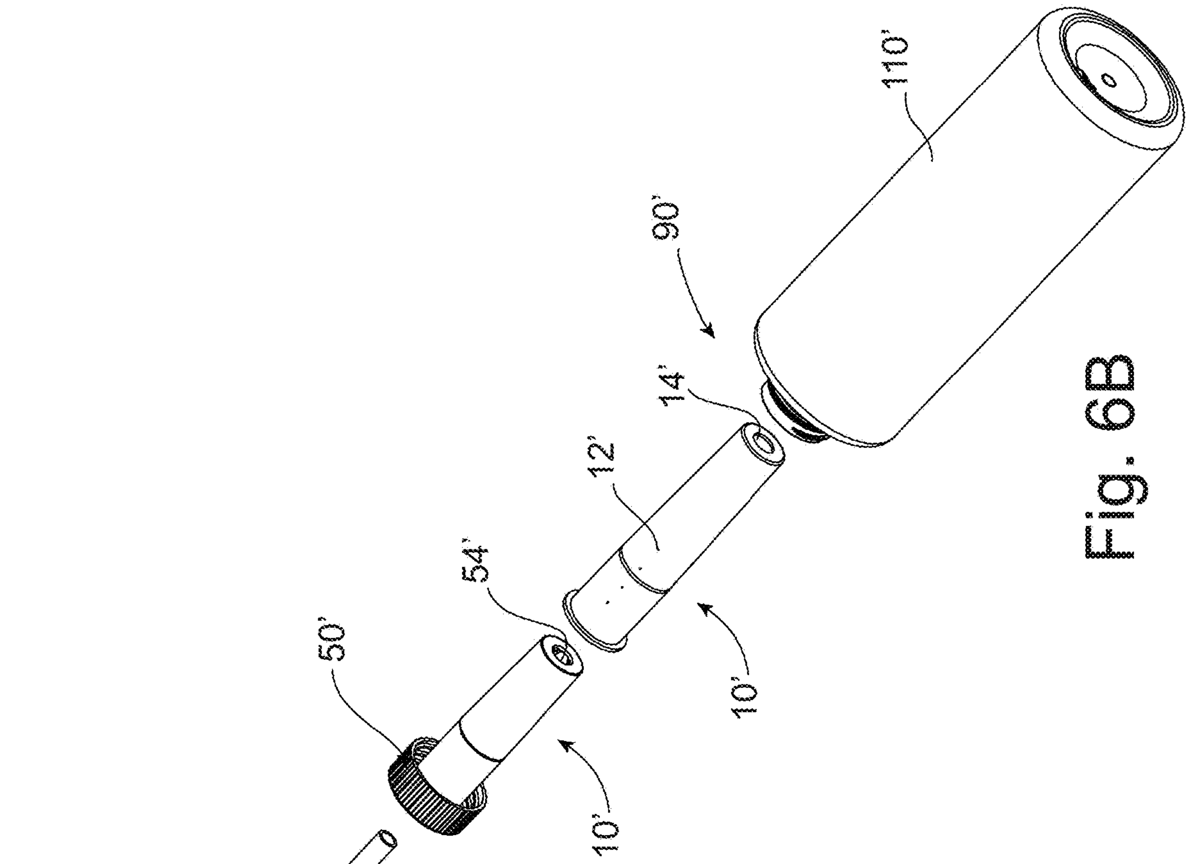
FIG. 6B is an exploded view of the embodiment in FIGS. 5A-B.
Figure 6A:
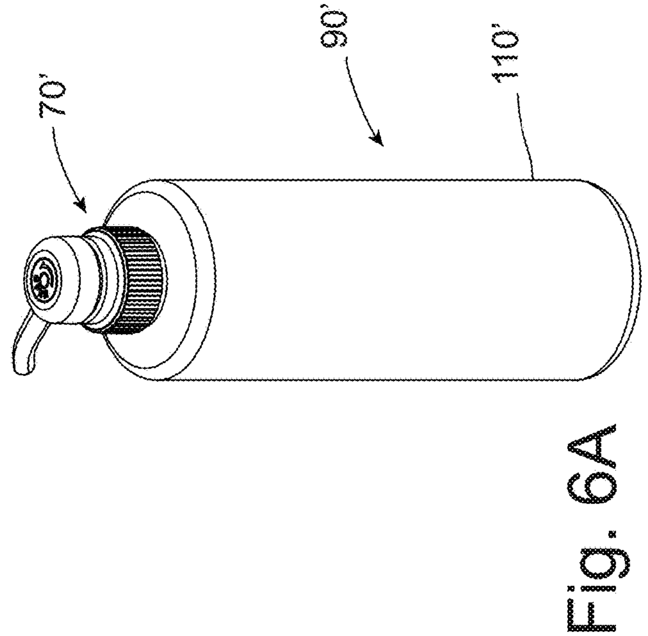
FIG. 6A is a perspective view of the embodiment in FIGS. 5A-B in the usage configuration.

FIGS. 6A and 6B show the usage configuration for package 90', with pump 70' that can be used for dispensing a liquid product from the package. Pump 70' can comprise dip tube 72' and pump assembly 71'.

In the usage configuration, shown in FIGS. 6A and 6B, includes bottle '110, insert '10, overcap 50', and pump '70.

In the embodiment showed in FIGS. 6A and 6B, the overcap is not removed before the pump is attached. Membrane '54 of overcap 50' can be pierceable by the end of dip tube '72 and does not need to be removed. The pump can be assembled by the end-user or the store before putting the package on the store shelf.

Figure 7D:
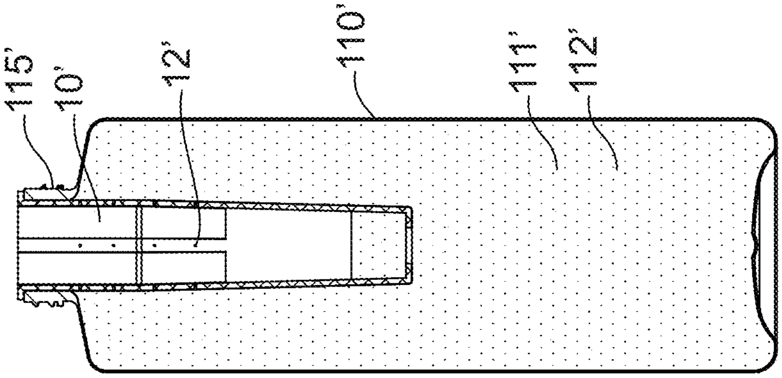
FIG. 7D is a cross-sectional view of the bottle where the insert is placed on the neck of the bottle.
Figure 7C:
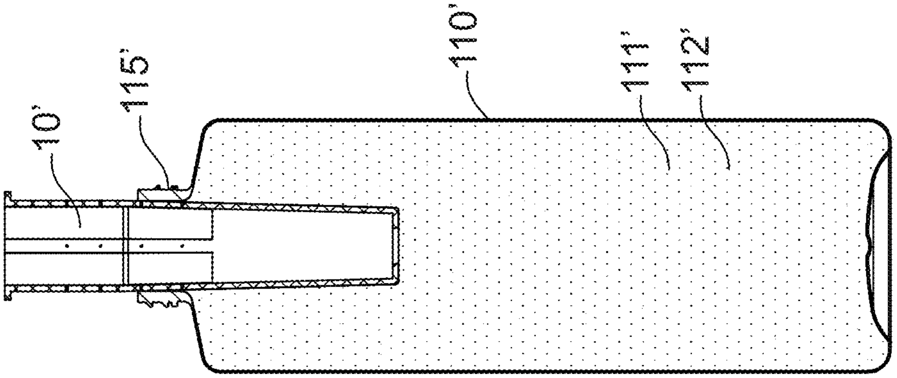
FIG. 7C is a cross-sectional view of the bottle with an insert partially placed onto the bottle.
Figure 7B:
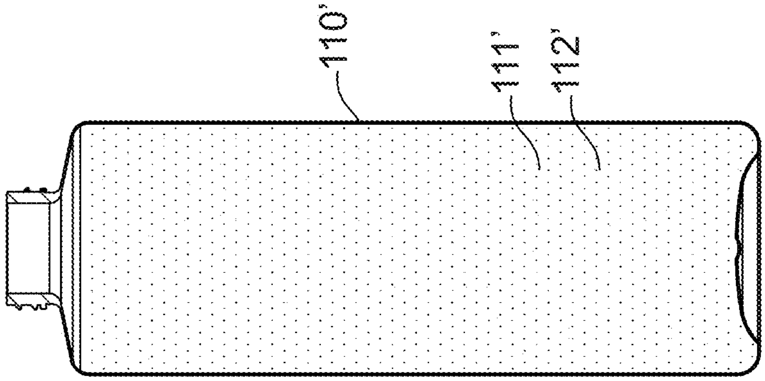
FIG. 7B is a cross-sectional view of the bottle filled with a liquid product.
Figure 7A:
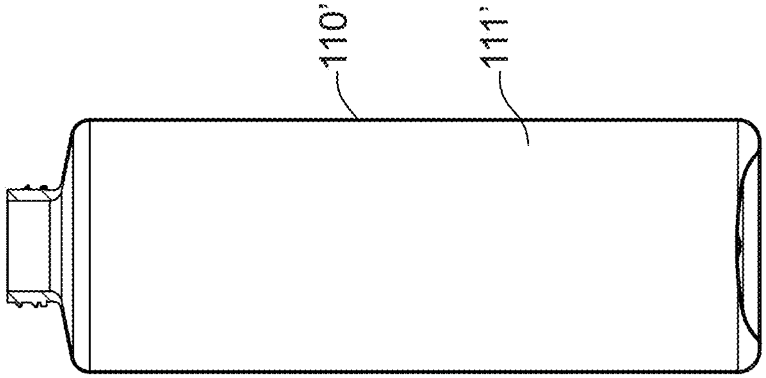
FIG. 7A is a cross-sectional view of an empty bottle.
Figures 7E, 7F, 7G, 7H:
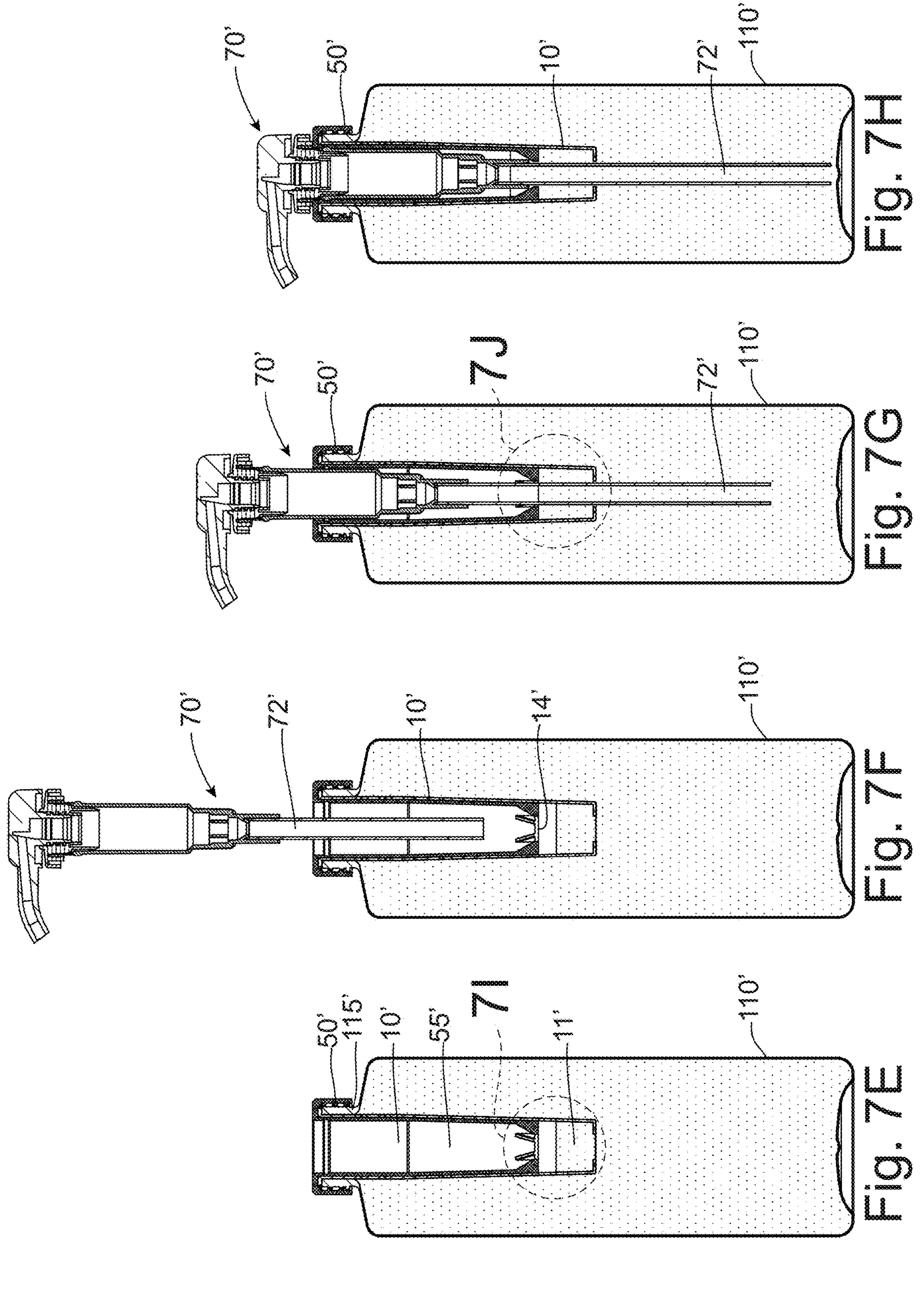
FIG. 7E is a cross-sectional view of the bottle with an overcap screwed on the bottle (referred to herein as the shipment configuration)
FIG. 7F is a cross-sectional view of the bottle where the dip tube has pierced the membrane of the overcap and partially placed into the insert.
FIG. 7G is a cross-sectional view of the bottle where the pump is assembled on the top of the overcap and the dip tube has pierced the membrane of the insert.
FIG. 7H is a cross-sectional view of the bottle where the pump is screwed onto the bottle and the product is ready for use.

FIGS. 7A to 7H are cross-sectional views of the package or portions thereof that show the steps to assemble the shipment configuration and the usage configuration for the embodiments shown in FIGS. 4A, 4B, 5A, and 5B. The steps are as follows:

- Step 1: provide an empty bottle. FIG. 7A, is a cross-sectional view of bottle 110' with hollow interior 111'.
- Step 2: fill empty bottle with liquid product. FIG. 7B is a cross-sectional view of bottle 110' where hollow interior 111' is filled with liquid product 112' with a design suspended therein.
- Step 3: Place insert through neck and into the hollow cavity. FIG. 7C is a cross-sectional view of bottle 110' with insert 10' which is place through neck 115' into hollow interior 111'. In FIG. 7C, insert 110' is not fully inserted and product 112 starts to move into the headspace.
- Step 4: insert placed on neck. FIG. 7D is a cross-sectional view of bottle 110' where insert 10' is fully inserted into hollow interior 111' through neck 115'. As shown in FIG. 7D, product 112' enters the insert through holes 12' during this step and the headspace in the bottle can be substantially eliminated.
- Step 5: Attach the overcap on bottle. FIG. 7E is a cross-sectional view of bottle 110' with overcap 50' detachably secured to the neck 115' of bottle 110'. In this configuration, plug portion 55' extends into hollow interior 11' of insert 10'. FIG. 7E shows the shipment configuration. If steps 1-4 are preformed correctly, the suspended design can be substantially in tact following the Ship Test.
- Step 6: Assemble the pump on the top of the overcap, insert the dip tube through the membrane at the distal end of the overcap, and begin inserting the pump through the hollow cavity of the insert, dip tube first. In FIG. 7F, the overcap is not removed. FIG. 7F shows pump 70' being inserted dip tube 72' first through the overcap's membrane. In FIG. 7F, the insert's membrane 14' has not been pierced and the overcap's membrane has been pierced.
- Step 7: Continue inserting the pump and pierce the membrane of the insert. FIG. 7G shows pump 70' after piercing both the insert's membrane and the overcap's membrane.
- Step 8: The pump is snapped into the overcap and then the pump dispenser package is ready for its first use. In FIG. 7H, pump 70' is secured to overcap 50'. Dip tube 72' is near the base of bottle 110' and dispenser package 90' is ready for its first use.

Figure 7I:
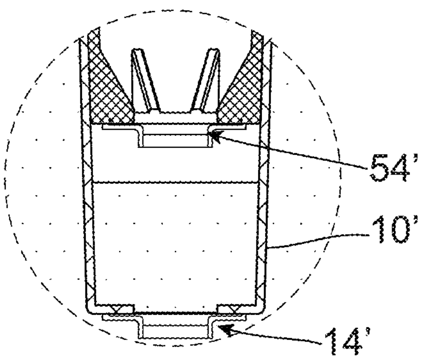
FIG. 7I is an enlarged cross-section view of the membrane of FIG. 7E.

FIG. 7I is an enlarged cross-section view of membrane 14', as shown in FIG. 7C. In this example, membrane 14' can be molded into the bottom of insert 10'.

Figure 7J:
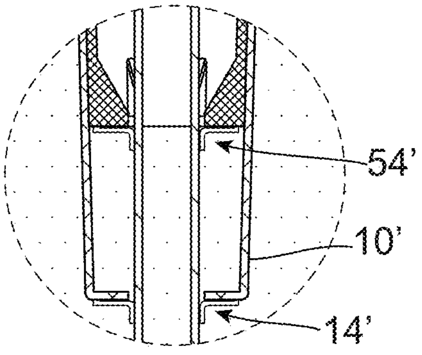
FIG. 7J is an enlarged cross-section view of the membrane of FIG. 7G.

FIG. 7J is an enlarged cross-section view of piercing membrane 14', as shown in FIG. 7G. In this example, the thin membrane is pierced by dip tube 72' during pump insertion.

Product

Many consumers want liquid beauty care products including shampoo, conditioner, and body wash, that deliver both good in use benefits, and have an aesthetically pleasing product appearance. In some examples, an aesthetically pleasing product appearance can be created when a second phase (e.g. sheet-like microcapsules and/or gel network swirls) is suspended across at least a portion of the liquid beauty care product. It can be difficult to keep a second discrete and stable. In some examples, in addition to using the bottle and insert described herein, it can be advantageous to formulate the composition, so it is phase stable. In some examples, the proper rheology (e.g. viscosity, yield stress and/or shear stress) of each phase can be balanced so the product is consumer acceptable, while maintaining suspended discrete stable phases that are in physical contact with each other.

The liquid beauty care product can contain a cleansing phase and a benefit phase. The cleansing phase can contain a surfactant system that can include one or more detersive surfactants and optionally a structurant. In some examples, the cleansing phase can be visibly clear with a light transmission greater than 60%, alternatively greater than 80% as measured by the Light Transmittance Method described hereafter. In other examples, the cleansing phase can appear hazy, cloudy, or even opaque. The cleansing phase can be colored, colorless, or combinations thereof.

The benefit phase can be opaque or translucent and can be suspended across the entire shampoo composition or one or more portions of the shampoo composition. In one example, the benefit phase can contain a gel network, which refers to a lamellar or vesicular solid crystalline phase that can contain at least one fatty alcohol, at least one surfactant, and water and/or other suitable solvents. In another example, the benefit phase can contain sheet like microcapsules having lamellar or strip-like, sheet or ribbon like form, as described in 2020/0188243, hereby incorporated herein by reference. The benefit phase can be uniform, non-uniform, or a combination thereof. The benefit phase can be any suitable shape(s) to form an aesthetic design including regular and/or irregular patterns, including swirls as shown in FIGS. 1A and 1B. The shape can form an aesthetic design that resembles the following non-limiting examples: bubbles, stripes, cross-hatching, zig-zag, floral, petal, herringbone, marbled, rectilinear, interrupted stripes, checked, mottled, veined, clustered, speckled, spotted, ribbons, helical, swirled, arrayed, variegated, waved, spiral, twisted, curved, streaks, laced, basket weaved, sinusoidal including but not limited to meander, and combinations thereof.

In addition to a gel network, the benefit phase can contain additional ingredients, including ingredients that could make the cleansing phase cloudy or opaque such as conditioning ingredients (e.g. cationic deposition polymer, silicones with an average particle size greater than 30 nm, crosslinked silicone elastomers), anti-dandruff actives (e.g. zinc pyrithione), aesthetic ingredients (e.g. mica), and combinations thereof. The additional ingredients can be carefully selected (e.g. the ingredient may not have too high a salt concentration) because it may disrupt the gel networks, causing the gel network structure to collapse, forcing the solvent out, which can destroy the aesthetic pattern and make the shampoo composition appear less effective.

The cleansing phase can have a yield stress, Herschel-Bulkley @ shear rate $10^{-2}$ to $10^{-4}$ Pa of from about 0.01 to about 20 Pa, alternatively from about 0.01 to about 10 Pa, alternatively from about 0.01 to about 5 dPa. The yield stress is measured at 26.7° C. by flow sweep at a shear rate 100 to 1.0e-4 l/s using Discovery Hybrid Rheometer (DHR-3) available from TA Instruments. To apply the Hershel-Bulkley model, the TA software to fit the model in the log space at a shear rate from $10^{-2}$ to $10^{-4}$ $s^{-1}$ is used.

The cleansing phase and/or the benefit phase can have a viscosity at @ 2 $s^{-1}$ Pa·s of from about 0.01 to about 15. The cleansing phase can have a viscosity @ 100 $s^{-1}$ Pa·s of from about 0.1 to about 4 Pa·s, alternatively from about 0.1 to about 2 Pa·s, alternatively from about 0.1 to about 1 Pa·s.

The benefit phase can have a shear stress of about 100 Pa to about 300 Pa at a shear rate of 950 $s^{-1}$, alternatively about 130 Pa to about 250 Pa at a shear rate of 950 $s^{-1}$, and alternatively about 160 Pa to about 225 Pa at a shear rate of 950 $s^{-1}$. The yield stress is measured at 25° C. by flow ramp at an initial shear rate 0.1 to final 1100 l/s using Discovery Hybrid Rheometer (DHR-3) available from TA Instruments.

The weight ratio of cleansing phase to benefit phase can be from about 1:2 to about 99:1, alternatively from about 1:1 to about 98:2, alternatively about 3:1 to about 97:3, alternatively from about 4:1 to about 96:4, alternatively from about 4:1 to about 20:1, alternatively from about 4:1 to about 10:1, alternatively from about 4:1 to about 9:1, alternatively from about 4:1 to about 7:1.

As used herein, the term "fluid" includes liquids and gels.

As used herein, "mixtures" is meant to include a simple combination of materials and any compounds that may result from their combination.

As used herein, "molecular weight" or "M·Wt." refers to the weight average molecular weight unless otherwise stated. Molecular weight is measured using industry standard method, gel permeation chromatography ("GPC"). The molecular weight has units of grams/mol.

As used herein, "shampoo composition" includes shampoo products such as shampoos, shampoo conditioners, conditioning shampoos, and other surfactant-based liquid compositions.

As used herein, the term "stable" means that the cleansing phase and the benefit phase appear as discrete phases that have not migrated to a human viewer with the unaided eye (excepting standard corrective lenses adapted to compensate for near-sightedness, farsightedness, or astigmatism, or other corrected vision) in lighting at least equal to the illumination of a standard 100-watt incandescent white light bulb at a distance of approximately 1 foot (0.30 m).

As used herein, "substantially free" means from about 0 wt % to about 3 wt %, alternatively from about 0 wt % to about 2 wt %, alternatively from about 0 wt % to about 1 wt %, alternatively from about 0 wt % to about 0.5 wt %, alternatively from about 0 wt % to about 0.25 wt %, alternatively from about 0 wt % to about 0.1 wt %, alternatively from about 0 wt % to about 0.05 wt %, alternatively from about 0 wt % to about 0.01 wt %, alternatively from about 0 wt % to about 0.001 wt %, and/or alternatively free of the ingredient. As used herein, "free of" means 0 wt %.

As used herein, the terms "include," "includes," and "including," are meant to be non-limiting and are understood to mean "comprise," "comprises," and "comprising," respectively.

All percentages, parts and ratios are based upon the total weight of the compositions described herein, unless otherwise specified. All such weights as they pertain to listed ingredients are based on the active level and, therefore, do not include carriers or by-products that may be included in commercially available materials.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Cleansing Phase

The multiphase shampoo compositions can include a cleansing phase that can be present in an amount of from about 5% to about 95%, preferably from about 10% to about 90%, and more preferably from about 20% to about 80% by weight of the composition. The cleansing phase can be an aqueous phase.

In some examples, the cleansing phase can be substantially free of or free of ingredients that can cause the phase to be cloudy, hazy, or opaque including silicones or other particles with an average particle size of greater than 30 nm, a dispersed gel network phase, synthetic polymers that form liquid crystal, and/or cationic surfactant.

In other examples, the cleansing phase can include small particle silicones (i.e. silicones with an average particle size of less than or equal to 30 nm), select cationic deposition polymer, perfumes, and/or dyes.

Detersive Surfactant

The cleansing phase can contain one or more detersive surfactants. As can be appreciated, detersive surfactants provide a cleaning benefit to soiled articles such as hair, skin, and hair follicles by facilitating the removal of oil and other soils. Surfactants generally facilitate such cleaning due to their amphiphilic nature which allows for the surfactants to break up, and form micelles around, oil and other soils which can then be rinsed out, thereby removing them from the soiled article. Suitable surfactants for a shampoo composition can include anionic moieties to allow for the formation of a coacervate with a cationic polymer. Suitable detersive surfactants can be compatible with the other ingredients in the cleansing phase and the adjacent benefit phase(s). The detersive surfactant can be selected from the group consisting of anionic surfactants, amphoteric surfactants, nonionic surfactants, and mixtures thereof.

The concentration of the surfactant in the composition should be sufficient to provide the desired cleaning and lather performance. The cleansing phase can contain a surfactant system at concentrations ranging from about 1% to about 50%, alternatively from about 3% to about 45%, alternatively from about 5% to about 40%, alternatively from about 7% to about 35%, alternatively from about 8% to about 30%, alternatively from about 8% to about 25%, alternatively from about 10% to about 20%, alternatively from about 11% to about 24%, and alternatively from about 12% to about 23%, by weight of the cleansing phase. The preferred pH range of the cleansing phase is from about 3 to about 10, alternatively from about 5 to about 8, and alternatively from about 5 to about 7.

The cleansing phase can contain one or more anionic surfactants at concentrations ranging from about 1% to 50%, alternatively from about 3% to about 40%, alternatively from about 5% to about 30%, alternatively from about 6% to about 25%, alternatively from about 8% to about 25%, by weight of the cleansing phase. The anionic surfactant can be the primary surfactant.

The shampoo composition comprises one or more detersive surfactants in the shampoo base. The detersive surfactant component is included in shampoo compositions to provide cleansing performance. The detersive surfactant may be selected from the group consisting of anionic, zwitterionic, amphoteric, cationic, or a combination thereof. In some examples, the detersive surfactant may be selected from the group consisting of anionic, zwitterionic, amphoteric, or a combination thereof. Such surfactants should be physically and chemically compatible with the components described herein, or should not otherwise unduly impair product stability, aesthetics or performance. Particularly suitable herein is sodium laureth-n-sulfate, wherein n=1 ("SLE1S"). SLE1S enables more efficient lathering and cleaning when compared to higher mole ethoxylate equivalents, especially in a shampoo composition that contains high levels of conditioning actives.

Suitable anionic detersive surfactants include those which are known for use in hair care or other personal care shampoo compositions. The anionic detersive surfactant may be a combination of sodium lauryl sulfate and sodium laureth-n sulfate. The concentration of the anionic surfactant in the composition should be sufficient to provide the desired cleaning and lather performance, and generally range from about 5% to about 30%, alternatively from about 8% to about 30%, alternatively from about 8% to about 25%, and alternatively from about 10% to about 17%, by weight of the composition.

Additional anionic surfactants suitable for use herein include alkyl and alkyl ether sulfates of the formula $ROSO_3M$ and $RO(C_2H_4O)_xSO_3M$, wherein R is alkyl or alkenyl of from about 8 to about 18 carbon atoms, x is 1 to 10, and M is a water-soluble cation such as ammonium, sodium, potassium, and triethanolamine cation or salts of the divalent magnesium ion with two anionic surfactant anions. The alkyl ether sulfates may be made as condensation products of ethylene oxide and monohydric alcohols having from about 8 to about 24 carbon atoms. The alcohols can be derived from fats such as coconut oil, palm oil, palm kernel oil, or tallow, or can be synthetic.

Other suitable anionic surfactants include water-soluble salts of the organic, sulfonic acids of the general formula [R'—$SO_3M$]. $R^1$ being a straight chain aliphatic hydrocarbon radical having from 13 to 17 carbon atoms, alternatively from 13 to 15 carbon atoms. M is a water soluble cation such as ammonium, sodium, potassium, and triethanolamine cation or salts of the divalent magnesium ion with two anionic surfactant anions. These materials are produced by the reaction of $SO_2$ and $O_2$ with suitable chain length normal paraffins ($C_{14}$-$C_{17}$) and are sold commercially as sodium paraffin sulfonates.

Examples of additional anionic surfactants suitable for use include, but are not limited to, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium laureth sulfate, sodium lauryl sarcosinate, sodium lauroyl sarcosinate, lauryl sarcosine, cocoyl sarcosine, ammonium cocoyl sulfate, ammonium lauroyl sulfate, sodium cocoyl sulfate, sodium lauroyl sulfate, potassium cocoyl sulfate, potassium lauryl sulfate, monoethanolamine cocoyl sulfate, sodium trideceth sulfate, sodium tridecyl sulfate, sodium methyl lauroyl taurate, sodium methyl cocoyl taurate, sodium lauroyl isethionate, sodium cocoyl isethionate, sodium laurethsulfosuccinate, sodium laurylsulfosuccinate, sodium tridecyl benzene sulfonate, sodium dodecyl benzene sulfonate, and mixtures thereof.

The shampoo composition may further comprise additional surfactants for use in combination with the anionic detersive surfactant component described herein. Suitable additional surfactants include cationic and nonionic surfactants.

Non-limiting examples of other anionic, zwitterionic, amphoteric, cationic, nonionic, or optional additional surfactants suitable for use in the compositions are described in McCutcheon's, Emulsifiers and Detergents, 1989 Annual, published by M. C. Publishing Co., and U.S. Pat. Nos. 3,929,678; 2,658,072; 2,438,091; and 2,528,378.

The shampoo compositions described herein can be substantially free of sulfate-based surfactants.

The one or more additional anionic surfactants may be selected from the group consisting of isethionates, sarcosinates, sulfonates, sulfosuccinates, sulfoacetates, acyl glycinates, acyl alaninates, acyl glutamates, lactates, lactylates, glucose carboxylates, amphoacetates, taurates, phosphate esters, and mixtures thereof. In that case, alkyl is defined as a saturated or unsaturated, straight or branched alkyl chain with 7 to 17 carbon atoms, alternatively with 9 to 13 carbon atoms. In that case, acyl is defined as of formula R—C(O)—, wherein R is a saturated or unsaturated, straight or branched alkyl chain with 7 to 17 carbon atoms, alternatively with 9 to 13 carbon atoms.

Suitable isethionate surfactants can include the reaction product of fatty acids esterified with isethionic acid and neutralized with sodium hydroxide. Suitable fatty acids for isethionate surfactants can be derived from coconut oil or palm kernel oil including amides of methyl tauride. Non-limiting examples of isethionates can be selected from the group consisting of sodium lauroyl methyl isethionate, sodium cocoyl isethionate, ammonium cocoyl isethionate, sodium hydrogenated cocoyl methyl isethionate, sodium lauroyl isethionate, sodium cocoyl methyl isethionate, sodium myristoyl isethionate, sodium oleoyl isethionate, sodium oleyl methyl isethionate, sodium palm kerneloyl isethionate, sodium stearoyl methyl isethionate, and mixtures thereof.

Non-limiting examples of sarcosinates can be selected from the group consisting of sodium lauroyl sarcosinate, sodium cocoyl sarcosinate, sodium myristoyl sarcosinate, TEA-cocoyl sarcosinate, ammonium cocoyl sarcosinate, ammonium lauroyl sarcosinate, dimer dilinoleyl bis-lauroylglutamate/lauroylsarcosinate, disodium lauroamphodiacetate, lauroyl sarcosinate, isopropyl lauroyl sarcosinate, potassium cocoyl sarcosinate, potassium lauroyl sarcosinate, sodium cocoyl sarcosinate, sodium lauroyl sarcosinate, sodium myristoyl sarcosinate, sodium oleoyl sarcosinate, sodium palmitoyl sarcosinate, TEA-cocoyl sarcosinate, TEA-lauroyl sarcosinate, TEA-oleoyl sarcosinate, TEA-palm kernel sarcosinate, and combinations thereof.

Non-limiting examples of sulfosuccinate surfactants can include disodium N-octadecyl sulfosuccinate, disodium lauryl sulfosuccinate, diammonium lauryl sulfosuccinate, sodium lauryl sulfosuccinate, disodium laureth sulfosuccinate, tetrasodium N-(1,2-dicarboxyethyl)-N-octadecyl sulfosuccinnate, diamyl ester of sodium sulfosuccinic acid, dihexyl ester of sodium sulfosuccinic acid, dioctyl esters of sodium sulfosuccinic acid, and combinations thereof.

Non-limiting examples of sulfoacetates can include sodium lauryl sulfoacetate, ammonium lauryl sulfoacetate and combination thereof.

Non-limiting examples of acyl glycinates can include sodium cocoyl glycinate, sodium lauroyl glycinate and combination thereof.

Non-limiting example of acyl alaninates can include sodium cocoyl alaninate, sodium lauroyl alaninate, sodium N-dodecanoyl-1-alaninate and combinations thereof.

Non-limiting examples of acyl glutamates can be selected from the group consisting of sodium cocoyl glutamate, disodium cocoyl glutamate, ammonium cocoyl glutamate, diammonium cocoyl glutamate, sodium lauroyl glutamate, disodium lauroyl glutamate, sodium cocoyl hydrolyzed wheat protein glutamate, disodium cocoyl hydrolyzed wheat protein glutamate, potassium cocoyl glutamate, dipotassium cocoyl glutamate, potassium lauroyl glutamate, dipotassium lauroyl glutamate, potassium cocoyl hydrolyzed wheat protein glutamate, dipotassium cocoyl hydrolyzed wheat protein glutamate, sodium capryloyl glutamate, disodium capryloyl glutamate, potassium capryloyl glutamate, dipotassium capryloyl glutamate, sodium undecylenoyl glutamate, disodium undecylenoyl glutamate, potassium undecylenoyl glutamate, dipotassium undecylenoyl glutamate, disodium hydrogenated tallow glutamate, sodium stearoyl glutamate, disodium stearoyl glutamate, potassium stearoyl glutamate, dipotassium stearoyl glutamate, sodium myristoyl glutamate, disodium myristoyl glutamate, potassium myristoyl glutamate, dipotassium myristoyl glutamate, sodium cocoyl/hydrogenated tallow glutamate, sodium cocoyl/palmoyl/sunfloweroyl glutamate, sodium hydrogenated tallowoyl glutamate, sodium olivoyl glutamate, disodium olivoyl glutamate, sodium palmoyl glutamate, disodium palmoyl glutamate, TEA-cocoyl glutamate, TEA-hydrogenated tallowoyl glutamate, TEA-lauroyl glutamate, and mixtures thereof.

Non-limiting examples of acyl glycinates can include sodium cocoyl glycinate, sodium lauroyl glycinate and combination thereof.

Non-limiting example of lactates can include sodium lactate.

Non-limiting examples of lactylates can include sodium lauroyl lactylate, sodium cocoyl lactylate and combination thereof.

Non-limiting examples of glucose carboxylates can include sodium lauryl glucoside carboxylate, sodium cocoyl glucoside carboxylate and combinations thereof.

Non-limiting examples of alkylamphoacetates can include sodium cocoyl amphoacetate, sodium lauroyl amphoacetate and combination thereof.

Non-limiting examples of acyl taurates can include sodium methyl cocoyl taurate, sodium methyl lauroyl taurate, sodium methyl oleoyl taurate and combination thereof.

The cleansing phase can contain one or more amphoteric and/or zwitterionic and/or non-ionic co-surfactants at concentrations ranging from about 0.25% to about 50%, alternatively from about 0.5% to about 30%, alternatively about 0.75% to about 15%, alternatively from about 1% to about 13%, and alternatively from about 2% to about 10%, by weight of the cleansing phase. The co-surfactant may serve to produce faster lather, facilitate easier rinsing, and/or mitigate harshness on the keratinous tissue. The co-surfactant further may aid in producing lather having more desirable texture, volume and/or other properties.

Amphoteric surfactants suitable for use herein include, but are not limited to derivatives of aliphatic secondary and tertiary amines in which the aliphatic radical can be straight or branched chain and wherein one substituent of the aliphatic substituents contains from about 8 to about 18 carbon atoms and one contains an anionic water solubilizing group, e.g., carboxy, sulfonate, sulfate, phosphate, or phosphonate. Examples include sodium 3-dodecyl-aminopropionate, sodium 3-dodecylaminopropane sulfonate, sodium lauryl sarcosinate, N-alkyltaurines such as the one prepared by reacting dodecylamine with sodium isethionate according to the teaching of U.S. Pat. No. 2,658,072, N-higher alkyl aspartic acids such as those produced according to the teaching of U.S. Pat. No. 2,438,091, and the products described in U.S. Pat. No. 2,528,378, and mixtures thereof. The amphoteric surfactants may selected from the family of betaines such as lauryolamphoacetate.

Zwitterionic surfactants suitable for use herein include, but are not limited to derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one substituent contains an anionic group, e.g., carboxy, sulfonate, sulfate, phosphate, or phosphonate. Other zwitterionic surfactants suitable for use herein include betaines, including high alkyl betaines such as coco dimethyl carboxymethyl betaine, cocoamidopropyl betaine, cocobetaine, lauryl amidopropyl betaine, oleyl betaine, lauryl dimethyl carboxymethyl betaine, lauryl dimethyl alphacarboxyethyl betaine, cetyl dimethyl carboxymethyl betaine, lauryl bis-(2-hydroxyethyl) carboxymethyl betaine, stearyl bis-(2-hydroxypropyl) carboxymethyl betaine, oleyl dimethyl gamma-carboxypropyl betaine, lauryl bis-(2-hydroxypropyl)alpha-carboxyethyl betaine, and mixtures thereof. The sulfobetaines may include coco dimethyl sulfopropyl betaine, stearyl dimethyl sulfopropyl betaine, lauryl dimethyl sulfoethyl betaine, lauryl bis-(2-hydroxyethyl) sulfopropyl betaine and mixtures thereof. Other suitable amphoteric surfactants include amidobetaines and amidosulfobetaines, wherein the RCONH$(CH_2)_3$ radical, wherein R is a $C_{11}$-$C_{17}$ alkyl, is attached to the nitrogen atom of the betaine.

Nonionic co-surfactants suitable for use in the composition for enhancing lather volume or texture include water soluble materials like lauryl dimethylamine oxide, cocodimethylamine oxide, cocoamidopropylamine oxide, laurylamidopropyl amine oxide, etc. or alkylpolyethoxylates like laureth-4 to laureth-7 and water insoluble components such as cocomonoethanol amide, cocodiethanol amide, lauroylmonoethanol amide, alkanoyl isopropanol amides, and fatty alcohols like cetyl alcohol and oleyl alcohol, and 2-hydroxyalkyl methyl ethers, etc.

Further suitable materials as co-surfactants herein include 1,2-alkylepoxides, 1,2-alkanediols, branched or straight chain alkyl glyceryl ethers (e.g., as disclosed in EP 1696023A1), 1,2-alkylcyclic carbonates, and 1,2-alkyl cyclicsulfites, particularly those wherein the alkyl group contains 6 to 14 carbon atoms in linear or branched configuration. Other examples include the alkyl ether alcohols derived from reacting $C_{10}$ or $C_{12}$ alpha olefins with ethylene glycol (e.g., hydroxyethyl-2-decyl ether, hydroxyethyl-2-dodecyl ether), as can be made according to U.S. Pat. Nos. 5,741,948; 5,994,595; 6,346,509; and 6,417,408.

Other nonionic surfactants may be selected from the group consisting of glucose amides, alkyl polyglucosides, sucrose cocoate, sucrose laurate, alkanolamides, ethoxylated alcohols and mixtures thereof. The nonionic surfactant is selected from the group consisting of glyceryl monohydroxystearate, isosteareth-2, trideceth-3, hydroxystearic acid, propylene glycol stearate, PEG-2 stearate, sorbitan monostearate, glyceryl laurate, laureth-2, cocamide monoethanolamine, lauramide monoethanolamine, and mixtures thereof.

The co-surfactant can be selected from the group consisting of Cocomonoethanol Amide, Cocoamidopropyl Betaine, Laurylamidopropyl Betaine, Cocobetaine, lauryl betaine, lauryl amine oxide, sodium lauryl amphoacetate; alkyl glyceryl ethers, alkyl-di-glyceryl ethers, 1,2-alkyl cyclic sulfites, 1,2-alkyl cyclic carbonates, 1,2-alkyl-epoxides, alkyl glycidylethers, and alkyl-1,3-dioxolanes, wherein the alkyl group contains 6 to 14 carbon atoms in linear or branched configuration; 1,2-alkane diols where the total carbon content is from 6 to 14 carbon atoms linear or branched, methyl-2-hydroxy-decyl ethers, hydroxyethyl-2-dodecyl ether, hydroxyethyl-2-decyl ether, and mixtures thereof.

Cationic surfactants may be derived from amines that are protonated at the pH of the formulation, e.g. bis-hydroxyethyl lauryl amine, lauryl dimethylamine, lauroyl dimethyl amidopropyl amine, cocoylamidopropyl amine, and the like. The cationic surfactants may also be derived from fatty quaternary ammonium salts such as lauryl trimethylammonium chloride and lauroylamidopropyl trimethyl ammonium chloride.

Alkylamphoacetates are suitable surfactants used in the compositions herein for improved product mildness and lather. The most commonly used alkylamphoacetates are lauroamphoacetate and cocoamphoacetate. Alkylamphoacetates can be comprised of monoacetates and diacetates. In some types of alkylamphoacetates, diacetates are impurities or unintended reaction products. However, the presence of diacetate can cause a variety of unfavorable composition characteristics when present in amounts over 15% of the alkylamphoacetates.

Suitable nonionic surfactants for use herein are those selected from the group consisting of glucose amides, alkyl polyglucosides, sucrose cocoate, sucrose laurate, alkanolamides, ethoxylated alcohols and mixtures thereof. In one embodiment the nonionic surfactant is selected from the group consisting of glyceryl monohydroxystearate, isosteareth-2, trideceth-3, hydroxystearic acid, propylene glycol stearate, PEG-2 stearate, sorbitan monostearate, glyceryl laurate, laureth-2, cocamide monoethanolamine, lauramide monoethanolamine, and mixtures thereof.

If present, the composition may comprise a rheology modifier, wherein said rheology modifier comprises cellulosic rheology modifiers, cross-linked acrylates, cross-linked maleic anhydride co-methylvinylethers, hydrophobically modified associative polymers, or a mixture thereof.

An electrolyte, if used, can be added per se to the composition or it can be formed in situ via the counterions included in one of the raw materials. The electrolyte may include an anion comprising phosphate, chloride, sulfate or citrate and a cation comprising sodium, ammonium, potassium, magnesium or mixtures thereof. The electrolyte may be sodium chloride, ammonium chloride, sodium or ammonium sulfate. The electrolyte may be added to the composition in the amount of from about 0.1 wt % to about 15 wt % by weight, alternatively from about 1 wt % to about 6 wt % by weight, and alternatively from about 3 wt % to about 6 wt %, by weight of the composition.

Structurant

The cleansing phase can include a structurant (ex. cross-linked polyacrylate, Carbopol® Aqua SF-1 polymer, available from Lubrizol®) to help provide the high, low-shear viscosity that can help maintain the stable discrete product phases in the shampoo composition overtime, which includes shipping, handling, distribution, and storage at a store, warehouse, or consumer's home shelf. The cleansing phase can include a structurant at concentrations effective for suspending a benefit phase in the cleansing phase and/or for modifying the viscosity of the composition. Such concentrations can range from about 0.05% to about 10%, alternatively from about 0.3% to about 5.0%, and alternatively from about 1.5% to about 5.0% by weight of the cleansing phase. As can be appreciated however, structurants may not be necessary when certain glyceride ester crystals are included as certain glyceride ester crystals can act as suitable suspending or structuring agents.

Suitable structurants can include anionic polymers and nonionic polymers. Useful herein are vinyl polymers such as cross linked acrylic acid polymers with the CTFA name Carbomer, cellulose derivatives and modified cellulose polymers such as methyl cellulose, ethyl cellulose, hydroxyethyl cellulose, hydroxypropyl methyl cellulose, nitro cellulose, sodium cellulose sulfate, sodium carboxymethyl cellulose, crystalline cellulose, cellulose powder, polyvinylpyrrolidone, polyvinyl alcohol, guar gum, hydroxypropyl guar gum, xanthan gum, *arabia* gum, tragacanth, galactan, carob gum, guar gum, karaya gum, carragheenin, pectin, agar, quince seed (*Cydonia oblonga* Mill), starch (rice, corn, potato, wheat), algae colloids (algae extract), microbiological polymers such as dextran, succinoglucan, pulleran, starch-based polymers such as carboxymethyl starch, methylhydroxypropyl starch, alginic acid-based polymers such as sodium alginate, alginic acid propylene glycol esters, acrylate polymers such as sodium polyacrylate, polyethylacrylate, polyacrylamide, polyethyleneimine, and inorganic water soluble material such as bentonite, aluminum magnesium silicate, laponite, hectonite, and anhydrous silicic acid.

Other suitable structurants can include crystalline structurants which can be categorized as acyl derivatives, long chain amine oxides, and mixtures thereof. Examples of such structurants are described in U.S. Pat. No. 4,741,855, which is incorporated herein by reference. Suitable structurants include ethylene glycol esters of fatty acids having from 16 to 22 carbon atoms. The structurant can be an ethylene glycol stearates, both mono and distearate, but particularly the distearate containing less than about 7% of the mono stearate. Other suitable structurants include alkanol amides of fatty acids, having from about 16 to about 22 carbon atoms, alternatively from about 16 to about 18 carbon atoms, suitable examples of which include stearic monoethanolamide, stearic diethanolamide, stearic monoisopropanolamide and stearic monoethanolamide stearate. Other long chain acyl derivatives include long chain esters of long chain fatty acids (e.g., stearyl stearate, cetyl palmitate, etc.); long chain esters of long chain alkanol amides (e.g., stearamide diethanolamide distearate, stearamide monoethanolamide stearate); and glyceryl esters as previously described. Long chain acyl derivatives, ethylene glycol esters of long chain carboxylic acids, long chain amine oxides, and alkanol amides of long chain carboxylic acids can also be used as structurants.

Other long chain acyl derivatives suitable for use as structurants include N,N-dihydrocarbyl amido benzoic acid and soluble salts thereof (e.g., Na, K), particularly N,N-di (hydrogenated) $C_{16}$, $C_{18}$ and tallow amido benzoic acid species of this family, which are commercially available from Stepan Company (Northfield, Ill., USA).

Examples of suitable long chain amine oxides for use as structurants include alkyl dimethyl amine oxides, e.g., stearyl dimethyl amine oxide.

Other suitable structurants include primary amines having a fatty alkyl moiety having at least about 16 carbon atoms, examples of which include palmitamine or stearamine, and secondary amines having two fatty alkyl moieties each having at least about 12 carbon atoms, examples of which include dipalmitoylamine or di(hydrogenated tallow)amine. Still other suitable structurants include di(hydrogenated tallow)phthalic acid amide, and crosslinked maleic anhydride-methyl vinyl ether copolymer.

Other suitable structurants include crystallizable glyceride esters. For example, suitable glyceride esters are hydrogenated castor oils such as trihydroxystearin or dihydroxystearin.

Examples of additional crystallizable glyceride esters can include the substantially pure triglyceride of 12-hydroxystearic acid. 12-hydroxystearic acid is the pure form of a fully hydrogenated triglyceride of 12-hydrox-9-cis-octadecenoic acid. As can be appreciated, many additional glyceride esters are possible. For example, variations in the hydrogenation process and natural variations in castor oil can enable the production of additional suitable glyceride esters from castor oil.

Viscosity Modifier

Viscosity modifiers can optionally be used to modify the rheology of the cleansing phase. Suitable viscosity modifiers can include Carbomers with tradenames Carbopol 934, Carbopol 940, Carbopol 950, Carbopol 980, and Carbopol 981, all available from B. F. Goodrich Company, acrylates/steareth-20 methacrylate copolymer with tradename ACRYSOL 22 available from Rohm and Hass, nonoxynyl hydroxyethylcellulose with tradename AMERCELL POLYMER HM-1500 available from Amerchol, methylcellulose with tradename BENECEL, hydroxyethyl cellulose with tradename NATROSOL, hydroxypropyl cellulose with tradename KLUCEL, cetyl hydroxyethyl cellulose with tradename POLYSURF 67, all supplied by Hercules, ethylene oxide and/or propylene oxide based polymers with tradenames CARBOWAX PEGs, POLYOX WASRs, and UCON FLUIDS, all supplied by Amerchol. Sodium chloride can also be used as a viscosity modifier. Other suitable rheology modifiers can include cross-linked acrylates, cross-linked maleic anhydride co-methylvinylethers, hydrophobically modified associative polymers, and mixtures thereof.

Benefit Phase

The benefit phase can include a sheet like microcapsules and/or a gel network that can contain one or more fatty alcohols.

Gel Network

The benefit phase can include a gel network that can contain one or more fatty alcohols. The gel network can provide conditioning benefits.

As used herein, the term "gel network" refers to a lamellar or vesicular solid crystalline phase which comprises at least one fatty alcohol as specified below, at least one secondary surfactant and/or fatty acid as specified below, and water and/or other suitable solvents. The lamellar or vesicular phase comprises bi-layers made up of a first layer comprising the fatty alcohol and/or fatty acid and the secondary surfactant and/or fatty acid and alternating with a second layer comprising the water or other suitable solvent. In another example, the gel network can include at least one fatty acid, at least one secondary surfactant, and water and/or other suitable solvents. The term "solid crystalline", as used herein, refers to the structure of the lamellar or vesicular phase which forms at a temperature below the melt transition temperature of the layer in the gel network comprising the one or more fatty alcohols.

The multiphase shampoo compositions can include benefit phase that can be present in an amount of from about 1% to about 90%, alternatively from about 2% to about 50%, alternatively from about 5% to about 40%, alternatively from about 7% to about 30%, alternatively from about 10% to about 25%, by weight of the shampoo composition. The benefit phase can have a transmission of less than 55%, alternatively less than 50%, alternatively less than 40%, alternatively less than 30%, and alternatively less than 25%, as measured by the Light Transmittance Method described hereafter. In some examples, the benefit phase can be substantially free of a structurant. In other examples, the benefit phase can be free of cationic surfactant and/or anionic surfactant.

The gel network as described herein can be prepared as a separate pre-mix, which, after being cooled, is combined with the cleansing phase as a visually discrete phase. Preparation of the gel network component is discussed in more detail below as well as in the Examples.

The cooled and pre-formed gel network component subsequently is added to the other components of the shampoo composition, including the detersive surfactant component. While not intending to be limited by theory, it is believed that incorporation of the cooled and pre-formed gel network component with the detersive surfactant and other components of the shampoo composition allows the formation of a substantially equilibrated lamellar dispersion ("ELD") in the final shampoo composition. The ELD is a dispersed lamellar or vesicular phase resulting from the pre-formed gel network component substantially equilibrating with the detersive surfactants, water, and other optional components, such as salts, which may be present in the shampoo composition. This equilibration occurs upon incorporation of the pre-formed gel network component with the other components of the shampoo composition and is effectively complete within about 24 hours after making. Shampoo compositions in which the ELD is formed provide hair with improved wet and dry conditioning benefits.

For purposes of clarification, as used herein, the term "ELD" refers to the same component of the shampoo compositions of the present invention as the phrase "gel network phase".

The presence of the gel network in the pre-mix and in the final shampoo composition in the form of the ELD can be confirmed by means known to one of skill in the art, such as X-ray analysis, optical microscopy, electron microscopy, and differential scanning calorimetry. A method of differential scanning calorimetry is described below. For methods of X-ray analysis, see U.S. 2006/0024256 A1.

The scale size of the gel network phase in the shampoo composition (i.e., the ELD) can range from about 10 nm to about 500 nm. The scale size of the gel network phase in the shampoo composition can range from about 0.5 μm to about 10 μm. Alternatively, the scale size of the gel network phase in the shampoo composition can range from about 10 μm to about 150 μm.

The scale size distribution of the gel network phase in the shampoo composition may be measured with a laser light scattering technique, using a Horiba model LA 910 Laser Scattering Particle Size Distribution Analyzer (Horiba Instruments, Inc. Irvine California, USA). The scale size distribution in a shampoo composition of the present invention may be measured by combining 1.75 g of the shampoo composition with 30 mL of 3% $NH_4Cl$, 20 mL of 2% $Na_2HPO_4 \cdot 7H_2O$, and 10 mL of 1% laureth-7 to form a mixture. This mixture is then stirred for 5 minutes. As appropriate for the individual Horiba instrument being used, samples in the range of 1 to 40 mL are taken and then injected into the Horiba instrument, which contains 75 mL of 3% $NH_4Cl$, 50 mL of 2% $Na_2HPO_4 \cdot 7H_2O$, and 25 mL of 1% laureth-7, until the Horiba instrument reading is between 88-92% T, which is needed for the scale size measurement. Once this is achieved, a measurement is taken after 2 minutes of circulation through the Horiba instrument to provide the scale size measurement. A subsequent measurement is taken using a sample of the shampoo composition which has been heated above the melt transition temperature of all fatty materials present in the shampoo composition, such that the gel network component is melted. This subsequent measurement allows a scale size distribution to be taken of all of the remaining materials in the shampoo, which then can be compared to the scale size distribution of the first sample and assist in the analysis.

Fatty Alcohol

The gel network component of the present invention can comprise at least one fatty alcohol. Individual fatty alcohol compounds or combinations of two or more different fatty alcohol compounds may be selected.

Fatty alcohols suitable for use in the present invention can include those having from about 16 to about 70 carbon atoms, alternatively from about 16 to about 60 carbon atoms, alternatively from about 16 to about 50 carbon atoms, alternatively from about 16 to about 40 carbon atoms, and alternatively from about 16 to about 22 carbon atoms. These fatty alcohols may be straight or branched chain alcohols and may be saturated or unsaturated. Non-limiting examples of suitable fatty alcohols include stearyl alcohol, arachidyl alcohol, behenyl alcohol, C21 fatty alcohol (1-heneicosanol), C23 fatty alcohol (1-tricosanol), C24 fatty alcohol (lignoceryl alcohol, 1-tetracosanol), C26 fatty alcohol (1-hexacosanol), C28 fatty alcohol (1-octacosanol), C30 fatty alcohol (1-triacontanol), C20-40 alcohols (e.g., Performacol 350 and 425 Alcohols, available from New Phase Technologies), C30-50 alcohols (e.g., Performacol 550 Alcohol), C40-60 alcohols (e.g., Performacol 700 Alcohol), cetyl alcohol, and mixtures thereof.

Mixtures of different fatty alcohols comprising one or more fatty alcohols having from about 16 to about 70 carbon atoms may also comprise some amount of one or more fatty alcohols or other fatty amphiphiles which have less than about 16 carbon atoms or greater than about 70 carbon atoms and still be considered to be within the scope of the present invention, provided that the resulting gel network phase can have a melt transition temperature of at least about 25° C., alternatively at least about 28° C., alternatively at least about 31° C., alternatively at least about 34° C., and alternatively at least about 37° C.

Such fatty alcohols suitable for use in the present invention may be of natural or vegetable origin, or they may be of synthetic origin.

The benefit phase may include fatty alcohol as part of the gel network phase in an amount of at least about 2.8%, alternatively from about 2.8% to about 25%, alternatively from about 4% to about 23%, alternatively from about 5% to about 20%, alternatively from about 6% to about 18%, alternatively from about 7% to about 15%, alternatively from about 8% to about 13%, by weight of the benefit phase.

In an embodiment of the present invention, the weight ratio of the fatty alcohol to the secondary surfactant in the gel network component is greater than about 1:9, alternatively from about 1:5 to about 100:1, and alternatively from about 1:1 to about 50:1.

Secondary Surfactant

The gel network component of the present invention may also comprise a secondary surfactant. As used herein, "secondary surfactant" refers to one or more surfactants which are combined with the fatty alcohol and water to form the gel network of the present invention as a pre-mix separate from the other components of the shampoo composition. The secondary surfactant is separate from and in addition to the detersive surfactant component of the cleansing phase. However, the secondary surfactant may be the same or different type of surfactant or surfactants as that or those selected for the detersive surfactant component described above.

The benefit phase of the present invention comprise secondary surfactant as part of the pre-formed gel network phase in an amount from about 0.01% to about 15%, alternatively, about 0.5% to about 12%, alternatively from about 0.7% to about 10%, and alternatively from about 1% to about 6%, by weight of the benefit phase.

Suitable secondary surfactants include anionic, zwitterionic, amphoteric, cationic, and nonionic surfactants. The secondary surfactant may be selected from anionic, cationic, and nonionic surfactants, and mixtures thereof. For additional discussion of secondary surfactants which are suitable for use in the present invention, see U.S. 2006/0024256 A1.

Additionally, certain secondary surfactants which have a hydrophobic tail group with a chain length of from about 16 to about 22 carbon atoms. For such secondary surfactants, the hydrophobic tail group may be alkyl, alkenyl (containing up to 3 double bonds), alkyl aromatic, or branched alkyl. the secondary surfactant may be present in the gel network component relative to the fatty alcohol at a weight ratio from about 1:5 to about 5:1. SLE1S may be particularly useful as SLE1S is a very efficient surfactant which foams well. In a shampoo composition with high levels of conditioning actives, SLE1S may further provide enhanced lather and cleaning.

Mixtures of more than one surfactant of the above specified types may be used for the secondary surfactant of the present invention.

Examples of gel network premixes may be found in U.S. Pat. No. 8,361,448 and US Pub. No. 2017/0367955, which are hereby incorporated by reference.

Fatty Acid

Non-limiting examples of suitable fatty acids, which can be combined with either the fatty alcohol or the secondary surfactant to form a gel network, can include unsaturated and/or branched long chain ($C_8$-$C_{24}$) liquid fatty acids or ester derivative thereof; unsaturated and/or branched long chain liquid alcohol or ether derivatives thereof, and mixtures thereof. The fatty acid can include short chain saturated fatty acids such as capric acid and caprylic acid. Without being limited by theory, it is believed that the unsaturated part of the fatty acid of alcohol or the branched part of the fatty acid or alcohol acts to "disorder" the surfactant hydrophobic chains and induce formation of lamellar phase. Examples of suitable liquid fatty acids can include oleic acid, isostearic acid, linoleic acid, linolenic acid, ricinoleic acid, elaidic acid, arichidonic acid, myristoleic acid, palmitoleic acid, and mixtures thereof. Examples of suitable ester derivatives can include propylene glycol isostearate, propylene glycol oleate, glyceryl isostearate, glyceryl oleate, polyglyceryl diisostearate and mixtures thereof. Examples of alcohols can include oleyl alcohol and isostearyl alcohol. Examples of ether derivatives can include isosteareth or oleth carboxylic acid; or isosteareth or oleth alcohol. The structuring agent may be defined as having melting point below about 25° C.

Sheet Like Microcapsules

In some examples, the shampoo product can contain sheet like microcapsules having lamellar or strip-like, sheet or ribbon like form. The shampoo product can comprise from about 0.05 wt % to about 10 wt %, alternatively from about 0.1 wt % to about 5 wt % of sheet like microcapsules. They can have a thickness less than the width, with a thickness of from about 0.01 to about 1 mm, alternatively from about 0.4 to about 0.8 mm (measurement at the middle of the sheet). The sheet-like microcapsules can be about 2 mm to about 20 mm in width and/or length, alternatively from about 5 mm to about 20 mm in width and/or length, alternatively from about 8 mm to about 15 mm in width and/or length. The shape can be any geometric shape, including but not limited to circular, petal, triangular, rectangular, oblong, and/or square. These shapes are non-spherical as their thickness is less than their length and/or width.

The sheet like microcapsules can be a gellan film and comprise from about 30 to about 40 parts of sodium alginate, from about 40 to about 50 parts gellan gum, from about 5 to about 10 parts polyvinyl alcohol, from about 5 to about 10 parts hydroxyl methyl cellulose sodium. The microcapsules may also comprise menthol, peppermint oil, menthyl lactate, jojoba oil, Vitamin E as well as dyes, other extracts and/or perfumes. The microcapsules, Dream Petals, are available from Sandream Impact LLC, Fairfield New Jersey.

Incorporation of sheet-like microcapsules into the shampoo product can be complex. The sheet-like microcapsules can fold, break, roll or otherwise fail to maintain the desired shape. This results in a less than desirable appearance in the bottle. Maintaining the proper rheology of the product results in sheet-like microcapsules distributed in the shampoo product while maintaining the desired shape.

Cationic Guar Polymer

The cationic polymer can be a cationic guar polymer, which is a cationically substituted galactomannan (guar) gum derivative. Suitable guar gums for guar gum derivatives can be obtained as a naturally occurring material from the seeds of the guar plant. As can be appreciated, the guar molecule is a straight chain mannan which is branched at regular intervals with single membered galactose units on alternative mannose units. The mannose units are linked to each other by means of β(1-4) glycosidic linkages. The galactose branching arises by way of an α(1-6) linkage. Cationic derivatives of the guar gums can be obtained through reactions between the hydroxyl groups of the polygalactomannan and reactive quaternary ammonium compounds. The degree of substitution of the cationic groups onto the guar structure can be sufficient to provide the requisite cationic charge density described above.

A cationic guar polymer can have a weight average molecular weight ("M·Wt.") of less than about 3 million g/mol, and can have a charge density from about 0.05 meq/g to about 2.5 meq/g. Alternatively, the cationic guar polymer can have a weight average M·Wt. of less than 1.5 million g/mol, from about 150 thousand g/mol to about 1.5 million g/mol, from about 200 thousand g/mol to about 1.5 million g/mol, from about 300 thousand g/mol to about 1.5 million g/mol, and from about 700,000 thousand g/mol to about 1.5 million g/mol. The cationic guar polymer can have a charge density from about 0.2 meq/g to about 2.2 meq/g, from about 0.3 meq/g to about 2.0 meq/g, from about 0.4 meq/g to about 1.8 meq/g; and from about 0.5 meq/g to about 1.7 meq/g.

A cationic guar polymer can have a weight average M·Wt. of less than about 1 million g/mol, and can have a charge density from about 0.1 meq/g to about 2.5 meq/g. A cationic guar polymer can have a weight average M·Wt. of less than 900 thousand g/mol, from about 150 thousand to about 800 thousand g/mol, from about 200 thousand g/mol to about 700 thousand g/mol, from about 300 thousand to about 700 thousand g/mol, from about 400 thousand to about 600 thousand g/mol, from about 150 thousand g/mol to about 800 thousand g/mol, from about 200 thousand g/mol to about 700 thousand g/mol, from about 300 thousand g/mol to about 700 thousand g/mol, and from about 400 thousand g/mol to about 600 thousand g/mol. A cationic guar polymer has a charge density from about 0.2 meq/g to about 2.2 meq/g, from about 0.3 meq/g to about 2.0 meq/g, from about 0.4 meq/g to about 1.8 meq/g; and from about 0.5 meq/g to about 1.5 meq/g.

A shampoo composition can include from about 0.01% to less than about 0.7%, by weight of the shampoo composition of a cationic guar polymer, from about 0.04% to about 0.55%, by weight, from about 0.08% to about 0.5%, by weight, from about 0.16% to about 0.5%, by weight, from about 0.2% to about 0.5%, by weight, from about 0.3% to about 0.5%, by weight, and from about 0.4% to about 0.5%, by weight.

The cationic guar polymer can be formed from quaternary ammonium compounds which conform to general Formula II:

Formula II

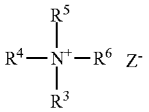

wherein where $R^3$, $R^4$ and $R^5$ are methyl or ethyl groups; and $R^6$ is either an epoxyalkyl group of the general Formula III:

Formula III

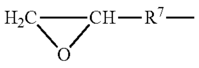

or $R^6$ is a halohydrin group of the general Formula IV:

Formula IV

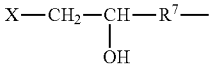

wherein $R^7$ is a $C_1$ to $C_3$ alkylene; X is chlorine or bromine, and Z is an anion such as Cl—, Br—, I— or $HSO_4$—.

Suitable cationic guar polymers can conform to the general formula V:

Formula V

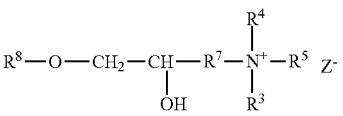

wherein $R^8$ is guar gum; and wherein $R^4$, $R^5$, $R^6$ and $R^7$ are as defined above; and wherein Z is a halogen. Suitable cationic guar polymers can conform to Formula VI:

Formula VI

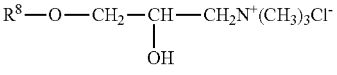

wherein $R^8$ is guar gum.

Suitable cationic guar polymers can also include cationic guar gum derivatives, such as guar hydroxypropyltrimonium chloride. Suitable examples of guar hydroxypropyltrimonium chlorides can include the Jaguar® series commercially available from Solvay S.A., Hi-Care Series from Rhodia, and N-Hance and AquaCat from Ashland Inc. Jaguar© C-500 has a charge density of 0.8 meq/g and a M·Wt. of 500,000 g/mole; Jaguar Optima has a cationic charge density of about 1.25 meg/g and a M·Wt. of about 500,000 g/moles; Jaguar® C-17 has a cationic charge density of about 0.6 meq/g and a M·Wt. of about 2.2 million g/mol; Jaguar® and a cationic charge density of about 0.8 meq/g; Hi-Care 1000 has a charge density of about 0.7 meq/g and a M·Wt. of about 600,000 g/mole; N-Hance 3269 and N-Hance 3270, have a charge density of about 0.7 meq/g and a M·Wt. of about 425,000 g/mole; N-Hance 3196 has a charge density of about 0.8 meq/g and a M·Wt. of about 1,100,000 g/mole; and AquaCat CG518 has a charge density of about 0.9 meq/g and a M·Wt. of about 50,000 g/mole. N-Hance BF-13 and N-Hance BF-17 are borate (boron) free guar polymers. N-Hance BF-13 has a charge density of about 1.1 meq/g and M·Wt of about 800,000 and N-Hance BF-17 has a charge density of about 1.7 meq/g and M·Wt of about 800,000. BF-17 has a charge density of about 1.7 meq/g and M·Wt of about 800,000. BF-17 has a charge density of about 1.7 meq/g and M·Wt of about 800,000. BF-17 has a charge density of about 1.7 meq/g and M·Wt of about 800,000. BF-17 has a charge density of about 1.7 meq/g and M·Wt of about 800,000.

Cationic Non-Guar Galactomannan Polymer

The cationic polymer can be a galactomannan polymer derivative. Suitable galactomannan polymer can have a mannose to galactose ratio of greater than 2:1 on a monomer to monomer basis and can be a cationic galactomannan polymer derivative or an amphoteric galactomannan polymer derivative having a net positive charge. As used herein, the term "cationic galactomannan" refers to a galactomannan polymer to which a cationic group is added. The term "amphoteric galactomannan" refers to a galactomannan polymer to which a cationic group and an anionic group are added such that the polymer has a net positive charge.

Galactomannan polymers can be present in the endosperm of seeds of the Leguminosae family. Galactomannan polymers are made up of a combination of mannose monomers and galactose monomers. The galactomannan molecule is a straight chain mannan branched at regular intervals with single membered galactose units on specific mannose units. The mannose units are linked to each other by means of β (1-4) glycosidic linkages. The galactose branching arises by way of an α (1-6) linkage. The ratio of mannose monomers to galactose monomers varies according to the species of the plant and can be affected by climate. Non Guar Galactomannan polymer derivatives can have a ratio of mannose to galactose of greater than 2:1 on a monomer to monomer basis. Suitable ratios of mannose to galactose can also be greater than 3:1 or greater than 4:1. Analysis of mannose to galactose ratios is well known in the art and is typically based on the measurement of the galactose content.

The gum for use in preparing the non-guar galactomannan polymer derivatives can be obtained from naturally occurring materials such as seeds or beans from plants. Examples of various non-guar galactomannan polymers include Tara gum (3 parts mannose/1 part galactose), Locust bean or Carob (4 parts mannose/1 part galactose), and *Cassia* gum (5 parts mannose/1 part galactose).

A non-guar galactomannan polymer derivative can have a M. Wt. from about 1,000 g/mol to about 10,000,000 g/mol, and a M·Wt. from about 5,000 g/mol to about 3,000,000 g/mol.

The shampoo compositions described herein can include galactomannan polymer derivatives which have a cationic charge density from about 0.5 meq/g to about 7 meq/g. The galactomannan polymer derivatives can have a cationic charge density from about 1 meq/g to about 5 meq/g. The degree of substitution of the cationic groups onto the galactomannan structure can be sufficient to provide the requisite cationic charge density.

A galactomannan polymer derivative can be a cationic derivative of the non-guar galactomannan polymer, which is obtained by reaction between the hydroxyl groups of the polygalactomannan polymer and reactive quaternary ammonium compounds. Suitable quaternary ammonium compounds for use in forming the cationic galactomannan polymer derivatives include those conforming to the general Formulas II to VI, as defined above.

Cationic non-guar galactomannan polymer derivatives formed from the reagents described above can be represented by the general Formula VII:

Formula VII

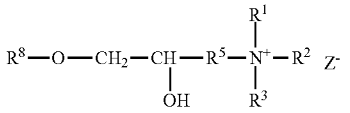

wherein R is the gum. The cationic galactomannan derivative can be a gum hydroxypropyltrimethylammonium chloride, which can be more specifically represented by the general Formula VIII:

Formula VIII

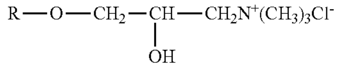

The galactomannan polymer derivative can be an amphoteric galactomannan polymer derivative having a net positive charge, obtained when the cationic galactomannan polymer derivative further comprises an anionic group.

A cationic non-guar galactomannan can have a ratio of mannose to galactose which is greater than about 4:1, a M·Wt. of about 100,000 g/mol to about 500,000 g/mol, a M·Wt. of about 50,000 g/mol to about 400,000 g/mol, and a cationic charge density from about 1 meq/g to about 5 meq/g, and from about 2 meq/g to about 4 meq/g.

Shampoo compositions can include at least about 0.05% of a galactomannan polymer derivative by weight of the composition. The shampoo compositions can include from about 0.05% to about 2%, by weight of the composition, of a galactomannan polymer derivative.

Cationic Starch Polymers

Suitable cationic polymers can also be water-soluble cationically modified starch polymers. As used herein, the term "cationically modified starch" refers to a starch to which a cationic group is added prior to degradation of the starch to a smaller molecular weight, or wherein a cationic group is added after modification of the starch to achieve a desired molecular weight. The definition of the term "cationically modified starch" also includes amphoterically modified starch. The term "amphoterically modified starch" refers to a starch hydrolysate to which a cationic group and an anionic group are added.

The shampoo compositions described herein can include cationically modified starch polymers at a range of about 0.01% to about 10%, and/or from about 0.05% to about 5%, by weight of the composition.

The cationically modified starch polymers disclosed herein have a percent of bound nitrogen of from about 0.5% to about 4%.

The cationically modified starch polymers can have a molecular weight from about 850,000 g/mol to about 15,000,000 g/mol and from about 900,000 g/mol to about 5,000,000 g/mol.

Cationically modified starch polymers can have a charge density of from about 0.2 meq/g to about 5 meq/g, and from about 0.2 meq/g to about 2 meq/g. The chemical modification to obtain such a charge density can include the addition of amino and/or ammonium groups into the starch molecules. Non-limiting examples of such ammonium groups can include substituents such as hydroxypropyl trimmonium chloride, trimethylhydroxypropyl ammonium chloride, dimethylstearylhydroxypropyl ammonium chloride, and dimethyldodecylhydroxypropyl ammonium chloride. Further details are described in Solarek, D. B., Cationic Starches in Modified Starches: Properties and Uses, Wurzburg, O. B., Ed., CRC Press, Inc., Boca Raton, Fla. 1986, pp 113-125 which is hereby incorporated by reference. The cationic groups can be added to the starch prior to degradation to a smaller molecular weight or the cationic groups may be added after such modification.

A cationically modified starch polymer can have a degree of substitution of a cationic group from about 0.2 to about 2.5. As used herein, the "degree of substitution" of the cationically modified starch polymers is an average measure of the number of hydroxyl groups on each anhydroglucose unit which is derivatized by substituent groups. Since each anhydroglucose unit has three potential hydroxyl groups available for substitution, the maximum possible degree of substitution is 3. The degree of substitution is expressed as the number of moles of substituent groups per mole of anhydroglucose unit, on a molar average basis. The degree of substitution can be determined using proton nuclear magnetic resonance spectroscopy ("$^1H$ NMR") methods well known in the art. Suitable $^1H$ NMR techniques include those described in "Observation on NMR Spectra of Starches in Dimethyl Sulfoxide, Iodine-Complexing, and Solvating in Water-Dimethyl Sulfoxide", Qin-Ji Peng and Arthur S. Perlin, Carbohydrate Research, 160 (1987), 57-72; and "An Approach to the Structural Analysis of Oligosaccharides by NMR Spectroscopy", J. Howard Bradbury and J. Grant Collins, Carbohydrate Research, 71, (1979), 15-25.

The source of starch before chemical modification can be selected from a variety of sources such as tubers, legumes, cereal, and grains. For example, starch sources can include corn starch, wheat starch, rice starch, waxy corn starch, oat starch, cassaya starch, waxy barley, waxy rice starch, glutenous rice starch, sweet rice starch, amioca, potato starch, tapioca starch, oat starch, sago starch, sweet rice, or mixtures thereof. Suitable cationically modified starch polymers can be selected from degraded cationic maize starch, cationic tapioca, cationic potato starch, and mixtures thereof. Cationically modified starch polymers are cationic corn starch and cationic tapioca.

The starch, prior to degradation or after modification to a smaller molecular weight, can include one or more additional modifications. For example, these modifications may include cross-linking, stabilization reactions, phosphorylations, and hydrolyzations. Stabilization reactions can include alkylation and esterification.

Cationically modified starch polymers can be included in a shampoo composition in the form of hydrolyzed starch (e.g., acid, enzyme, or alkaline degradation), oxidized starch (e.g., peroxide, peracid, hypochlorite, alkaline, or any other oxidizing agent), physically/mechanically degraded starch (e.g., via the thermo-mechanical energy input of the processing equipment), or combinations thereof.

The starch can be readily soluble in water and can form a substantially translucent solution in water. The transparency of the composition is measured by Ultra-Violet/Visible ("UV/VIS") spectrophotometry, which determines the absorption or transmission of UV/VIS light by a sample, using a Gretag Macbeth Colorimeter Color. A light wavelength of 600 nm has been shown to be adequate for characterizing the degree of clarity of shampoo compositions.

Cationic Copolymer of an Acrylamide Monomer and a Cationic Monomer

A shampoo composition can include a cationic copolymer of an acrylamide monomer and a cationic monomer, wherein the copolymer has a charge density of from about 1.0 meq/g to about 3.0 meq/g. The cationic copolymer can be a synthetic cationic copolymer of acrylamide monomers and cationic monomers.

Suitable cationic polymers can include:

(i) an acrylamide monomer of the following Formula IX:

Formula IX

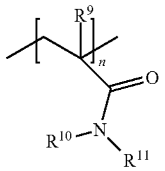

where $R^9$ is H or $C_{1-4}$ alkyl; and $R^{10}$ and $R^{11}$ are independently selected from the group consisting of H, $C_{1-4}$ alkyl, $CH_2OCH_3$, $CH_2OCH_2CH(CH_3)_2$, and phenyl, or together are C3-6cycloalkyl; and (ii) a cationic monomer conforming to Formula X:

Formula X

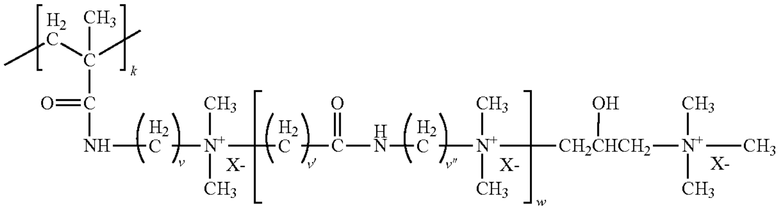

where k=1, each of v, v', and v" is independently an integer of from 1 to 6, w is zero or an integer of from 1 to 10, and $X^-$ is an anion.

A cationic monomer can conform to Formula X where k=1, v=3 and w=0, z=1 and $X^-$ is $Cl^-$ to form the following structure (Formula XI):

Formula XI

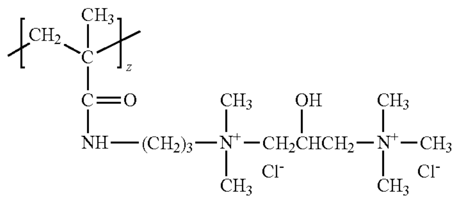

As can be appreciated, the above structure can be referred to as diquat.

A cationic monomer can conform to Formula X wherein v and v" are each 3, v'=1, w=1, y=1 and $X^-$ is $Cl^-$, to form the following structure of Formula XII:

Formula XII

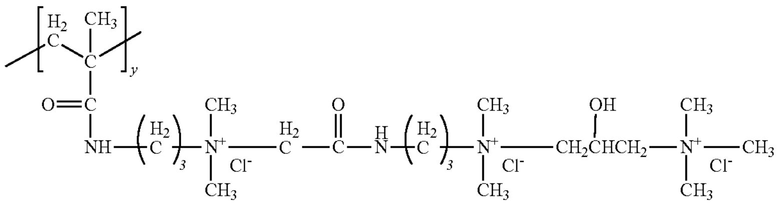

The structure of Formula XII can be referred to as triquat.

The acrylamide monomer can be either acrylamide or methacrylamide.

The cationic copolymer can be AM:TRIQUAT which is a copolymer of acrylamide and 1,3-Propanediaminium,N-[2-[[[dimethyl[3-[(2-methyl-1-oxo-2-propenyl)amino]propyl] ammonio]acetyl]amino]ethyl]2-hydroxy-N,N,N',N',N'-pentamethyl-, trichloride. AM:TRIQUAT is also known as polyquaternium 76 (PQ76). AM:TRIQUAT can have a charge density of 1.6 meq/g and a M·Wt. of 1.1 million g/mol.

The cationic copolymer can include an acrylamide monomer and a cationic monomer, wherein the cationic monomer is selected from the group consisting of: dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide; ethylenimine, vinylamine, 2-vinylpyridine, 4-vinylpyridine; trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido chloride, trimethyl ammonium propyl (meth)acrylamido chloride, vinylbenzyl trimethyl ammonium chloride, diallyldimethyl ammonium chloride, and mixtures thereof.

The cationic copolymer can include a cationic monomer selected from the group consisting of: trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido chloride, trimethyl ammonium propyl (meth)acrylamido chloride, vinylbenzyl trimethyl ammonium chloride, and mixtures thereof.

The cationic copolymer can be formed from (1) copolymers of (meth)acrylamide and cationic monomers based on (meth)acrylamide, and/or hydrolysis-stable cationic monomers, (2) terpolymers of (meth)acrylamide, monomers based on cationic (meth)acrylic acid esters, and monomers based on (meth)acrylamide, and/or hydrolysis-stable cationic monomers. Monomers based on cationic (meth)acrylic acid esters can be cationized esters of the (meth)acrylic acid containing a quaternized N atom. Cationized esters of the (meth)acrylic acid containing a quaternized N atom can be quaternized dialkylaminoalkyl (meth)acrylates with $C_1$ to $C_3$ in the alkyl and alkylene groups. The cationized esters of the (meth)acrylic acid containing a quaternized N atom can be selected from the group consisting of: ammonium salts of dimethylaminomethyl (meth)acrylate, dimethylaminoethyl (meth)acrylate, dimethylaminopropyl (meth)acrylate, diethylaminomethyl (meth)acrylate, diethylaminoethyl (meth) acrylate; and diethylaminopropyl (meth)acrylate quaternized with methyl chloride. The cationized esters of the (meth)acrylic acid containing a quaternized N atom can be dimethylaminoethyl acrylate, which is quaternized with an alkyl halide, or with methyl chloride or benzyl chloride or dimethyl sulfate (ADAME-Quat).

The cationic monomer when based on (meth)acrylamides are quaternized dialkylaminoalkyl(meth)acrylamides with $C_1$ to $C_3$ in the alkyl and alkylene groups, or dimethylaminopropylacrylamide, which is quaternized with an alkyl halide, or methyl chloride or benzyl chloride or dimethyl sulfate.

The cationic monomer based on a (meth)acrylamide can be a quaternized dialkylaminoalkyl(meth)acrylamide with $C_1$ to $C_3$ in the alkyl and alkylene groups. The cationic monomer based on a (meth)acrylamide can be dimethylaminopropylacrylamide, which is quaternized with an alkyl halide, especially methyl chloride or benzyl chloride or dimethyl sulfate.

The cationic monomer can be a hydrolysis-stable cationic monomer. Hydrolysis-stable cationic monomers can be, in addition to a dialkylaminoalkyl(meth)acrylamide, any monomer that can be regarded as stable to the OECD hydrolysis test. The cationic monomer can be hydrolysis-stable and the hydrolysis-stable cationic monomer can be selected from the group consisting of: diallyldimethylammonium chloride and water-soluble, cationic styrene derivatives.

The cationic copolymer can be a terpolymer of acrylamide, 2-dimethylammoniumethyl (meth)acrylate quaternized with methyl chloride (ADAME-Q) and 3-dimethylammoniumpropyl(meth)acrylamide quaternized with methyl chloride (DIMAPA-Q). The cationic copolymer can be formed from acrylamide and acrylamidopropyltrimethylammonium chloride, wherein the acrylamidopropyltrimethylammonium chloride has a charge density of from about 1.0 meq/g to about 3.0 meq/g.

The cationic copolymer can have a charge density of from about 1.1 meq/g to about 2.5 meq/g, from about 1.1 meq/g to about 2.3 meq/g, from about 1.2 meq/g to about 2.2 meq/g, from about 1.2 meq/g to about 2.1 meq/g, from about 1.3 meq/g to about 2.0 meq/g, and from about 1.3 meq/g to about 1.9 meq/g.

The cationic copolymer can have a M·Wt. from about 100 thousand g/mol to about 2 million g/mol, from about 300 thousand g/mol to about 1.8 million g/mol, from about 500 thousand g/mol to about 1.6 million g/mol, from about 700 thousand g/mol to about 1.4 million g/mol, and from about 900 thousand g/mol to about 1.2 million g/mol.

The cationic copolymer can be a trimethylammoniopropylmethacrylamide chloride-N-Acrylamide copolymer, which is also known as AM:MAPTAC. AM:MAPTAC can have a charge density of about 1.3 meq/g and a M·Wt. of about 1.1 million g/mol. The cationic copolymer can be AM:ATPAC. AM:ATPAC can have a charge density of about 1.8 meq/g and a M·Wt. of about 1.1 million g/mol.

Synthetic Polymers

A cationic polymer can be a synthetic polymer that is formed from:

i) one or more cationic monomer units, and optionally ii) one or more monomer units bearing a negative charge, and/or iii) a nonionic monomer, wherein the subsequent charge of the copolymer is positive. The ratio of the three types of monomers is given by "m", "p" and "q" where "m" is the number of cationic monomers, "p" is the number of monomers bearing a negative charge and "q" is the number of nonionic monomers The cationic polymers can be water soluble or dispersible, non-crosslinked, and synthetic cationic polymers which have the structure of Formula XIII:

Formula XIII

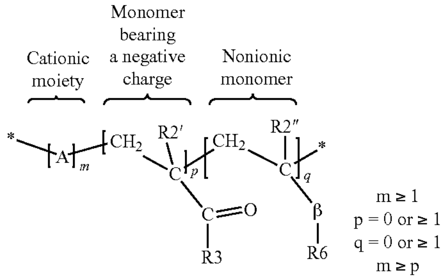

where A, may be one or more of the following cationic moieties:

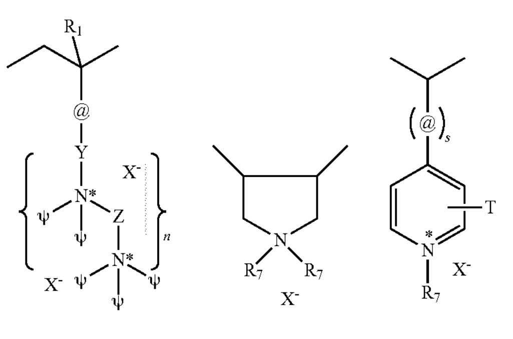

where @=amido, alkylamido, ester, ether, alkyl or alkylaryl;
where Y=C1-C22 alkyl, alkoxy, alkylidene, alkyl or aryloxy;
where ψC1-C22 alkyl, alkyloxy, alkyl aryl or alkyl arylox;
where Z=C1-C22 alkyl, alkyloxy, aryl or aryloxy;
where R1=H, C1-C4 linear or branched alkyl;
where s=0 or 1, n=0 or >1;
where T and R7=C1-C22 alkyl; and
where X−=halogen, hydroxide, alkoxide, sulfate or alkylsulfate.

Where the monomer bearing a negative charge is defined by R2'=H, $C_1$-$C_4$ linear or branched alkyl and R3 is:

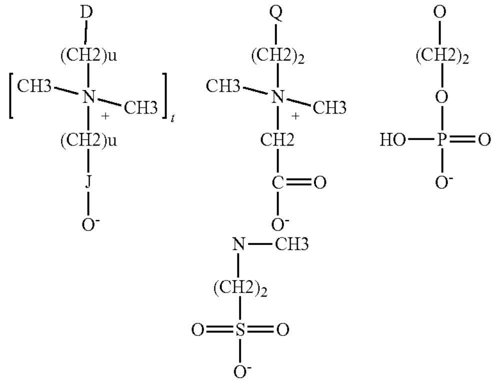

where D=O, N, or S;
where Q=$NH_2$ or O;
where u=1-6;
where t=0-1; and
where J=oxygenated functional group containing the following elements P, S, C.

Where the nonionic monomer is defined by R2"=H, $C_1$-$C_4$ linear or branched alkyl, R6=linear or branched alkyl, alkyl aryl, aryl oxy, alkyloxy, alkylaryl oxy and b is defined as

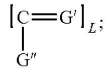;

and where G' and G" are, independently of one another, O, S or N—H and L=0 or 1.

Suitable monomers can include aminoalkyl (meth)acrylates, (meth)aminoalkyl (meth)acrylamides; monomers comprising at least one secondary, tertiary or quaternary amine function, or a heterocyclic group containing a nitrogen atom, vinylamine or ethylenimine; diallyldialkyl ammonium salts; their mixtures, their salts, and macromonomers deriving from therefrom.

Further examples of suitable cationic monomers can include dimethylaminoethyl (meth)acrylate, dimethylaminopropyl (meth)acrylate, ditertiobutylaminoethyl (meth) acrylate, dimethylaminomethyl (meth)acrylamide, dimethylaminopropyl (meth)acrylamide, ethylenimine, vinylamine, 2-vinylpyridine, 4-vinylpyridine, trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido chloride, trimethyl ammonium propyl (meth)acrylamido chloride, vinylbenzyl trimethyl ammonium chloride, diallyldimethyl ammonium chloride.

Suitable cationic monomers can include quaternary monomers of formula —$NR_3^+$, wherein each R can be identical or different, and can be a hydrogen atom, an alkyl group comprising 1 to 10 carbon atoms, or a benzyl group, optionally carrying a hydroxyl group, and including an anion (counter-ion). Examples of suitable anions include halides such as chlorides, bromides, sulphates, hydrosulphates, alkylsulphates (for example comprising 1 to 6 carbon atoms), phosphates, citrates, formates, and acetates.

Suitable cationic monomers can also include trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido chloride, trimethyl ammonium propyl (meth)acrylamido chloride, vinylbenzyl trimethyl ammonium chloride. Additional suitable cationic monomers can include trimethyl ammonium propyl (meth) acrylamido chloride.

Examples of monomers bearing a negative charge include alpha ethylenically unsaturated monomers including a phosphate or phosphonate group, alpha ethylenically unsaturated monocarboxylic acids, monoalkylesters of alpha ethylenically unsaturated dicarboxylic acids, monoalkylamides of alpha ethylenically unsaturated dicarboxylic acids, alpha ethylenically unsaturated compounds comprising a sulphonic acid group, and salts of alpha ethylenically unsaturated compounds comprising a sulphonic acid group.

Suitable monomers with a negative charge can include acrylic acid, methacrylic acid, vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid, 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulphonate (SS).

Examples of nonionic monomers can include vinyl acetate, amides of alpha ethylenically unsaturated carboxylic acids, esters of an alpha ethylenically unsaturated monocarboxylic acids with an hydrogenated or fluorinated alcohol, polyethylene oxide (meth)acrylate (i.e. polyethoxylated (meth)acrylic acid), monoalkylesters of alpha ethylenically unsaturated dicarboxylic acids, monoalkylamides of alpha ethylenically unsaturated dicarboxylic acids, vinyl nitriles, vinylamine amides, vinyl alcohol, vinyl pyrolidone, and vinyl aromatic compounds.

Suitable nonionic monomers can also include styrene, acrylamide, methacrylamide, acrylonitrile, methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, 2-ethyl-hexyl methacrylate, 2-hydroxyethylacrylate and 2-hydroxyethylmethacrylate.

The anionic counterion ($X^-$) in association with the synthetic cationic polymers can be any known counterion so long as the polymers remain soluble or dispersible in water, in the shampoo composition, or in a coacervate phase of the shampoo composition, and so long as the counterions are physically and chemically compatible with the essential components of the shampoo composition or do not otherwise unduly impair product performance, stability or aesthetics. Non limiting examples of suitable counterions can include halides (e.g., chlorine, fluorine, bromine, iodine), sulfate, and methylsulfate.

The cationic polymer described herein can also aid in repairing damaged hair, particularly chemically treated hair by providing a surrogate hydrophobic F-layer. The microscopically thin F-layer provides natural weatherproofing, while helping to seal in moisture and prevent further damage. Chemical treatments damage the hair cuticle and strip away its protective F-layer. As the F-layer is stripped away, the hair becomes increasingly hydrophilic. It has been found that when lyotropic liquid crystals are applied to chemically treated hair, the hair becomes more hydrophobic and more virgin-like, in both look and feel. Without being limited to any theory, it is believed that the lyotropic liquid crystal complex creates a hydrophobic layer or film, which coats the hair fibers and protects the hair, much like the natural F-layer protects the hair. The hydrophobic layer can return the hair to a generally virgin-like, healthier state. Lyotropic liquid crystals are formed by combining the synthetic cationic polymers described herein with the aforementioned anionic detersive surfactant component of the shampoo composition. The synthetic cationic polymer has a relatively high charge density. It should be noted that some synthetic polymers having a relatively high cationic charge density do not form lyotropic liquid crystals, primarily due to their abnormal linear charge densities. Such synthetic cationic polymers are described in PCT Patent App. No. WO 94/06403 which is incorporated by reference. The synthetic polymers described herein can be formulated in a stable shampoo composition that provides improved conditioning performance, with respect to damaged hair.

Cationic synthetic polymers that can form lyotropic liquid crystals have a cationic charge density of from about 2 meq/gm to about 7 meq/gm, and/or from about 3 meq/gm to about 7 meq/gm, and/or from about 4 meq/gm to about 7 meq/gm. The cationic charge density is about 6.2 meq/gm. The polymers also have a M. Wt. of from about 1,000 to about 5,000,000, and/or from about 10,000 to about 2,000,000, and/or from about 100,000 to about 2,000,000.

Cationic synthetic polymers that provide enhanced conditioning and deposition of benefit agents but do not necessarily form lytropic liquid crystals can have a cationic charge density of from about 0.7 meq/gm to about 7 meq/gm, and/or from about 0.8 meq/gm to about 5 meq/gm, and/or from about 1.0 meq/gm to about 3 meq/gm. The polymers also have a M·Wt. of from about 1,000 g/mol to about 5,000,000 g/mol, from about 10,000 g/mol to about 2,000,000 g/mol, and from about 100,000 g/mol to about 2,000,000 g/mol.

Cationic Cellulose Polymer

Suitable cationic polymers can be cellulose polymers. Suitable cellulose polymers can include salts of hydroxyethyl cellulose reacted with trimethyl ammonium substituted epoxide, referred to in the industry (CTFA) as Polyquaternium 10 and available from Dwo/Amerchol Corp. (Edison, N.J., USA) in their Polymer LR, JR, and KG series of polymers. Other suitable types of cationic cellulose can include the polymeric quaternary ammonium salts of hydroxyethyl cellulose reacted with lauryl dimethyl ammonium-substituted epoxide referred to in the industry (CTFA) as Polyquaternium 24. These materials are available from Dow/Amerchol Corp. under the tradename Polymer LM-200. Other suitable types of cationic cellulose can include the polymeric quaternary ammonium salts of hydroxyethyl cellulose reacted with lauryl dimethyl ammonium-substituted epoxide and trimethyl ammonium substituted epoxide referred to in the industry (CTFA) as Polyquaternium 67. These materials are available from Dow/Amerchol Corp. under the tradename SoftCAT Polymer SL-5, SoftCAT Polymer SL-30, Polymer SL-60, Polymer SL-100, Polymer SK-L, Polymer SK-M, Polymer SK-MH, and Polymer SK-H.

Additional cationic polymers are also described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)), which is incorporated herein by reference.

Techniques for analysis of formation of complex coacervates are known in the art. For example, microscopic analyses of the compositions, at any chosen stage of dilution, can be utilized to identify whether a coacervate phase has formed. Such coacervate phase can be identifiable as an additional emulsified phase in the composition. The use of dyes can aid in distinguishing the coacervate phase from other insoluble phases dispersed in the composition. Additional details about the use of cationic polymers and coacervates are disclosed in U.S. Pat. No. 9,272,164 which is incorporated by reference.

Silicone

The shampoo composition can include a silicone conditioning agent. The silicone conditioning agent can be in the benefit phase and/or the cleansing phase. Suitable silicone conditioning agents can include volatile silicone, non-volatile silicone, or combinations thereof. If including a silicone conditioning agent, the agent can be included from about 0.01% to about 10%, by weight of the composition, from about 0.1% to about 8%, from about 0.1% to about 5%, and/or from about 0.2% to about 2%, by weight of the cleansing phase, benefit phase, or composition. Examples of suitable silicone conditioning agents, and optional suspending agents for the silicone, are described in U.S. Reissue Pat. No. 34,584, U.S. Pat. Nos. 5,104,646, and 5,106,609, each of which is incorporated by reference herein. Suitable silicone conditioning agents can have a viscosity, as measured at 25° C., from about 20 centistokes ("csk") to about 2,000,000 csk, from about 1,000 csk to about 1,800,000 csk, from about 50,000 csk to about 1,500,000 csk, and from about 100,000 csk to about 1,500,000 csk.

The dispersed silicone conditioning agent particles can have a volume average particle diameter ranging from about 0.01 micrometer to about 50 micrometer. For small particle application to hair, the volume average particle diameters can range from about 0.01 micrometer to about 4 micrometer, from about 0.01 micrometer to about 2 micrometer, from about 0.01 micrometer to about 0.5 micrometer. For larger particle application to hair, the volume average particle diameters typically range from about 5 micrometer to about 125 micrometer, from about 10 micrometer to about 90 micrometer, from about 15 micrometer to about 70 micrometer, and/or from about 20 micrometer to about 50 micrometer.

Additional material on silicones including sections discussing silicone fluids, gums, and resins, as well as manufacture of silicones, are found in *Encyclopedia of Polymer Science and Engineering*, vol. 15, 2d ed., pp 204-308, John Wiley & Sons, Inc. (1989), which is incorporated herein by reference.

Silicone emulsions suitable for the shampoo compositions described herein can include emulsions of insoluble polysiloxanes prepared in accordance with the descriptions provided in U.S. Pat. No. 4,476,282 and U.S. Patent Application Publication No. 2007/0276087 each of which is incorporated herein by reference. Suitable insoluble polysiloxanes include polysiloxanes such as alpha, omega hydroxy-terminated polysiloxanes or alpha, omega alkoxy-terminated polysiloxanes having a molecular weight within the range from about 50,000 to about 500,000 g/mol. The insoluble polysiloxane can have an average molecular weight within the range from about 50,000 to about 500,000 g/mol. For example, the insoluble polysiloxane may have an average molecular weight within the range from about 60,000 to about 400,000; from about 75,000 to about 300,000; from about 100,000 to about 200,000; or the average molecular weight may be about 150,000 g/mol. The insoluble polysiloxane can have an average particle size within the range from about 30 nm to about 10 micron. The average particle size may be within the range from about 40 nm to about 5 micron, from about 50 nm to about Imicron, from about 75 nm to about 500 nm, or about 100 nm, for example.

Other classes of silicones suitable for the shampoo compositions described herein can include i) silicone fluids, including silicone oils, which are flowable materials having viscosity less than about 1,000,000 csk as measured at 25° C.; ii) aminosilicones, which contain at least one primary, secondary or tertiary amine; iii) cationic silicones, which contain at least one quaternary ammonium functional group; iv) silicone gums; which include materials having viscosity greater or equal to 1,000,000 csk as measured at 25° C.; v) silicone resins, which include highly cross-linked polymeric siloxane systems; vi) high refractive index silicones, having refractive index of at least 1.46, and vii) mixtures thereof.

Alternatively, the shampoo composition can be substantially free of silicones.

Aqueous Carrier

The cleansing phase and the benefit phase can both include an aqueous carrier. Accordingly, the formulations of the shampoo composition can be in the form of a pourable liquid (under ambient conditions). The cleansing phase can contain an aqueous carrier that can be present from about 15% to about 95%, alternatively from about 50% to about 93%, alternatively from about 60% to about 92%, alternatively from about 70% to about 90%, alternatively from about 72% to about 88%, and alternatively from about 75% to about 85%, by weight of the cleansing phase. The benefit phase can contain an aqueous carrier that can be present from about 25% to about 98%, alternatively from about 40% to about 95%, alternatively from about 50% to about 90%, alternatively from about 60% to about 85%, alternatively from about 65% to about 83%, by weight of the benefit phase.

The aqueous carrier may comprise water, or a miscible mixture of water and organic solvent, and in one aspect may comprise water with minimal or no significant concentrations of organic solvent, except as otherwise incidentally incorporated into the composition as minor ingredients of other components.

The aqueous carriers useful in the shampoo composition can include water. In another example, the shampoo compositions can include water solutions of lower alkyl alcohols and polyhydric alcohols. The lower alkyl alcohols can include monohydric alcohols having 1 to 6 carbons, in one aspect, ethanol and isopropanol. The polyhydric alcohols can include propylene glycol, dipropylene glycol, hexylene glycol, glycerin, and propane diol.

Optional Components

As can be appreciated, shampoo compositions described herein can include a variety of optional components to tailor the properties and characteristics of the composition. As can be appreciated, suitable optional components are well known and can generally include any components which are physically and chemically compatible with the essential components of the shampoo compositions described herein. Optional components should not otherwise unduly impair product stability, aesthetics, or performance. Optional components can be in the cleansing phase and/or the benefit phase. Individual concentrations of optional components can generally range from about 0.001% to about 10%, by weight of a shampoo composition. Optional components in the cleansing phase can be further limited to components which will not impair the clarity of a translucent shampoo composition.

Suitable optional components which can be included in a shampoo composition can include deposition aids, conditioning agents (including hydrocarbon oils, fatty esters, silicones), anti-dandruff agents, suspending agents, viscosity modifiers, dyes, nonvolatile solvents or diluents (water soluble and insoluble), pearlescent aids, foam boosters, pediculocides, pH adjusting agents, perfumes, preservatives, chelants, proteins, skin active agents, sunscreens, UV absorbers, and vitamins. The CTFA Cosmetic Ingredient Handbook, Tenth Edition (published by the Cosmetic, Toiletry, and Fragrance Association, Inc., Washington, D.C.) (2004) (hereinafter "CTFA"), describes a wide variety of non-limiting materials that can be added to the composition herein.

Suitable optional components which can be included in a shampoo composition can include amino acids can be included. Suitable amino acids can include water soluble vitamins such as vitamins B1, B2, B6, B12, C, pantothenic acid, pantothenyl ethyl ether, panthenol, biotin, and their derivatives, water soluble amino acids such as asparagine, alanin, indole, glutamic acid and their salts, water insoluble vitamins such as vitamin A, D, E, and their derivatives, water insoluble amino acids such as tyrosine, tryptamine, and their salts.

Additional Cosmetic Materials

A shampoo composition can further include one or more additional cosmetic materials. Exemplary additional cosmetic materials can include, but are not limited to, particles, colorants, perfume microcapsules, gel networks, and other insoluble skin or hair conditioning agents such as skin silicones, natural oils such as sunflower oil or castor oil. The additional cosmetic material can be selected from the group consisting of: particles; colorants; perfume microcapsules; gel networks; other insoluble skin or hair conditioning agents such as skin silicones, natural oils such as sun flower oil or castor oil; and mixtures thereof.

Anti-Dandruff Actives

The shampoo compositions may also contain an anti-dandruff active. The anti-dandruff active can be present in the cleansing phase and/or the benefit phase. Soluble anti-dandruff actives, such as piroctone olamine can be present in the cleansing phase or the benefit phase. Non-soluble anti-dandruff actives such as pyridinethione (e.g. zinc pyrithione) can be present in the benefit phase. In some examples, the cleansing phase can be substantially free of non-soluble anti-dandruff actives. Suitable non-limiting examples of anti-dandruff actives include pyridinethione salts, azoles, selenium sulfide, particulate sulfur, keratolytic agents, and mixtures thereof. Such anti-dandruff actives should be physically and chemically compatible with the components of the composition, and should not otherwise unduly impair product stability, aesthetics or performance. When present in the composition, the anti-dandruff active is included in an amount from about 0.01% to about 5%, alternatively from about 0.1% to about 3%, and alternatively from about 0.3% to about 2%, by weight of the composition, benefit phase, or cleansing phase.

TEST METHODS

Hair Wet Feel Friction Measurement (Final Rinse Friction and Initial Rinse Friction)

A switch of 4 grams general population hair at 8 inches length is used for the measurement. Water temperature is set at 100° F., hardness is 7 grain per gallon, and flow rate is 1.6 liter per minute. For shampoos in liquid form, 0.2 ml of a liquid shampoo is applied on the hair switch in a zigzag pattern uniformly to cover the entire hair length, using a syringe. For shampoo in aerosol foam form, foam shampoo is dispensed to a weighing pan on a balance. 0.2 grams of foam shampoo is taken out from weighing pan and applied on the hair switch uniformly to cover the entire hair length via a spatula. The hair switch is then 1st lathered for 30 seconds, rinse with water for 30 seconds, and 2nd lathered for 30 seconds. Water flow rate is then reduced to 0.2 liter per minute. The hair switch is sandwiched with a clamp under 1800 gram of force and pulled through the entire length while the water is running at the low flow rate. The pull time is 30 second. Friction is measured with a friction analyzer with a load cell of 5 kg. Repeat the pull under rinse for total of 21 times. Total 21 friction values are collected. The final rinse friction is the average friction of the last 7 points and initial rinse friction is the average of the initial 7 points. The delta final to initial is calculated by subtracting the final rinse friction from the initial rinse friction.

Light Transmittance

% T can be measured using Ultra-Violet/Visible (UV/VI) spectrophotometry which determines the transmission of UV/VIS light through a sample. A light wavelength of 600 nm has been shown to be adequate for characterizing the degree of light transmittance through a sample. Typically, it is best to follow the specific instructions relating to the specific spectrophotometer being used. In general, the procedure for measuring percent transmittance starts by setting the spectrophotometer to 600 nm. Then a calibration "blank" is run to calibrate the readout to 100 percent transmittance. A single test sample is then placed in a cuvette designed to fit the specific spectrophotometer and care is taken to insure no air bubbles are within the sample before the % T is measured by the spectrophotometer at 600 nm.

Combinations

A. Packaging comprising:
   a. an insert with an insert wall defining a hollow interior and a lip defining an opening and a pierceable membrane distal to the opening;
   b. a bottle defining a hollow interior and a neck defining an opening through which at least a portion of the insert is receivable into the hollow interior;
   c. an overcap detachably secured to the neck, the overcap comprising a plug portion that is receivable into the hollow interior of the insert.

B. Packaging comprising:
   a. an insert with an insert wall defining a hollow interior and a lip defining an opening and a pierced membrane distal to the opening;
   b. a bottle defining a hollow interior and a neck defining an opening through which at least a portion of the insert is receivable into the hollow interior;
   c. a pump comprising a dip tube and a pump assembly wherein the dip tube is fluidly connected to the pump assembly and wherein the dip tube is receivable into the hollow interior of the insert and extends through the pierced membrane; wherein the packaging is a pump dispenser; and
   d. optionally a closure detachably secured to the neck.

C. The packaging according to Paragraphs A-B, where the insert further comprises one or more holes, preferably two or more holes, and more preferably three or more holes, that extend through an insert outer wall and an insert inner wall.

D. The packaging according to Paragraph C, wherein the plug portion extends past the two or more holes and seals the holes.

E. The packaging of according to Paragraphs C-D, wherein the holes can be from about 0.001 in. (25.4 μm) to about 0.1 in. (2540 μm) in diameter, preferably from about 0.005 in. (127 μm) to about 0.06 in. (1524 μm) in diameter, more preferably from about 0.008 in. (203.2 μm) to about 0.04 in. (1016 μm) in diameter, and alternatively from about 0.01 in. (254 μm) to about 0.02 in. (508 μm) in diameter.

F. The packaging according to Paragraphs A-E, wherein the plug portion comprises a hollow interior and a pierceable membrane at an end distal to a cap.

G. The packaging according to Paragraphs A-F, wherein the bottle comprises a volume from about 200 mL to about 1500 mL, preferably from about 300 mL to about 1000 mL, and more preferably from about 500 mL to about 1000 mL.

H. The packaging according to Paragraphs A-G, wherein the bottle opening has a diameter and the diameter is less than or equal to 75 mm, preferably less than or equal to 50 mm, and preferably less than or equal to 25 mm.

I. The packaging according to Paragraphs A-H, wherein at least a portion of the bottle is transparent.

J. The packaging according to Paragraphs A-I, wherein the bottle, overcap, and/or insert can be made from comprise polyethylene terephthalate (PET), polypropylene (PP), polyethylene (PE), and/or polyethylene naphthalate (PEN), and combinations thereof.

K. The packaging according to Paragraphs A-J, wherein the packaging is adapted for shipping and handling.

L. The packaging according to Paragraphs A-K, wherein the liquid composition comprises a design suspended therein.

M. The packaging according to Paragraphs A-L wherein the design is substantially unchanged following the Ship Test.

N. The packaging according to Paragraphs A-M, wherein the plug portion comprises a hollow interior and a pierced membrane at an end distal to a cap.

O. The packaging according to Paragraphs N, wherein the dip tube is receivable into the hollow interior of the plug portion and the dip tube extends through the pierced membrane of the plug.

P. A method for preserving the suspended design in a liquid product:
   a. providing a bottle defining a hollow interior and a neck defining an opening;
   b. filling the bottle with a liquid beauty care product to a target fill level with a headspace and suspending a design in the liquid beauty care product;
   c. inserting an insert through the opening into the hollow interior until the insert has a snap fit with the neck; wherein the insert comprises holes;
   wherein immediately after the insert is inserted and the headspace is less than 5% of the volume of the bottle, preferably less than 3%, more preferably less than 1%, even more preferably less than 0.2%;
   d. wherein a portion of liquid composition enters the hollow interior of the insert through the holes;
   e. attaching an overcap to the neck wherein the overcap comprises a plug portion extending into the hollow insert interior and sealing the holes;
   wherein the design is substantially unchanged following the Ship Test and the bottle comprises the liquid product comprising a preserved suspended design.

Q. The method according to Paragraph P, wherein immediately after the insert is inserted the bottle comprises substantially no headspace or no headspace.

R. The method according to Paragraphs P-Q, wherein the bottle comprises an over-pressure following attachment of the overcap.

S. The method of Paragraphs P-R, wherein the liquid product comprises shampoo.

T. The method of Paragraphs P-S, wherein the liquid product comprises a yield stress of from about 0.01 to about 20 at a shear rate of $10^{-2}$ to $10^{-4}$ s, of from about 0.01 to about 20 Pa, preferably from about 0.01 to about 10 Pa, alternatively from about 0.01 to about 5 Pa according to the Herschel-Bulkley model.

U. A method for dispensing the liquid composition with the preserved suspended design of claim 15 comprising:
   a. removing the overcap;
   b. providing a pump comprising a dip tube and a pump assembly wherein the dip tube is fluidly connected to the pump assembly;
   c. inserting the dip tube through the hollow cavity of the insert;
   d. piercing the membrane;
   e. securing the pump;
   f. dispensing the liquid composition with the preserved suspended design.

It will be appreciated that other modifications of the present disclosure are within the skill of those in the hair care formulation art can be undertaken without departing from the spirit and scope of this invention. All parts, percentages, and ratios herein are by weight unless otherwise specified. Some components may come from suppliers as dilute solutions. The levels given reflect the weight percent of the active material, unless otherwise specified. A level of perfume and/or preservatives may also be included in the following examples.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Packaging comprising:

a. an insert comprising an insert wall defining a hollow interior and a lip defining an opening and a pierceable membrane distal to the opening, the insert further comprising two or more holes that extend through the insert wall;

b. a bottle defining a hollow interior and a neck defining an opening through which at least a portion of the insert is receivable into the hollow interior;

c. an overcap detachably secured to the neck, the overcap comprising a plug portion that is receivable into the hollow interior of the insert.

2. The packaging of claim 1, wherein the plug portion extends past the two or more holes and seals the holes.

3. The packaging of claim 1, wherein the holes have a diameter of about 0.005 in. to about 0.06 in.

4. The packaging of claim 1, wherein the plug portion comprises a hollow interior and a pierceable membrane at an end distal to a cap.

5. The packaging of claim 1, wherein the at least a portion of the bottle is transparent.

6. The packaging of claim 1, wherein the bottle, overcap, and/or insert comprise polyethylene terephthalate (PET), polypropylene (PP), polyethylene (PE), and/or polyethylene naphthalate (PEN), and combinations thereof.

7. The packaging of claim 1, wherein the packaging is adapted for shipping and handling.

8. The packaging of claim 1, wherein a liquid composition resides in the hollow interior and the liquid composition comprises a cleansing phase and a benefit phase wherein the cleansing phase and the benefit phase are visually discrete phases, in physical contact, and form an aesthetic design suspended across at least a portion of the bottle.

9. The packaging of claim 8, wherein the design is unchanged following the Ship Test.

10. A pump dispenser comprising:

a. an insert comprising an insert wall defining a hollow interior and a lip defining an opening and a pierced membrane distal to the opening;

b. a bottle defining a hollow interior and a neck defining an opening through which at least a portion of the insert is receivable into the hollow interior;

c. a pump comprising a dip tube and a pump assembly wherein the dip tube is fluidly connected to the pump assembly and wherein the dip tube is receivable into the hollow interior of the insert and extends through the pierced membrane; and d. a plug portion comprising a hollow interior and a pierced membrane at an end distal to a cap.

11. The pump dispenser of claim 10, wherein the pump further comprises a closure detachably secured to the neck.

12. The pump dispenser of claim 10, wherein the dip tube is receivable into the hollow interior of the plug portion and the dip tube extends through the pierced membrane of the plug.

13. A method for preserving a design suspended in a liquid product:

a. providing a bottle defining a hollow interior and a neck defining an opening;

b. filling the bottle with a liquid beauty care product to a target fill level with a headspace and suspending the design in the liquid beauty care product;

c. inserting an insert through the opening into the hollow interior until the insert has a snap fit with the neck; wherein the insert comprises holes;

wherein immediately after the insert is inserted and the headspace is less than 2%;

d. wherein a portion of liquid composition enters the hollow interior of the insert through the holes;

e. attaching an overcap to the neck wherein the overcap comprises a plug portion extending into the hollow insert interior and sealing the holes; wherein the design is unchanged following the Ship Test and the bottle comprises the liquid product comprising a maintained suspended design.

14. The method of claim 13, wherein immediately after the insert is inserted the bottle comprises no headspace or no headspace.

15. The method of claim 13, wherein the bottle comprises an over-pressure following attachment of the overcap.

16. The method of claim 13, wherein the liquid product comprises shampoo.

17. The method of claim 13 wherein the liquid product comprises a yield stress of about 0.01 to about 20 at a shear rate of $10^{-2}$ to $10^{-4}$ $s^{-1}$ according to the Herschel-Bulkley model.

18. A method for dispensing the liquid composition with the maintained suspended design of claim 13 comprising:

a. removing the overcap;

b. providing a pump comprising a dip tube and a pump assembly wherein the dip tube is fluidly connected to the pump assembly;

c. inserting the dip tube through the hollow cavity of the insert;

d. piercing the membrane;

e. securing the pump;

f. dispensing the liquid composition with the maintained suspended design.

* * * * *